US008465369B2

(12) United States Patent
Dokei et al.

(10) Patent No.: US 8,465,369 B2
(45) Date of Patent: Jun. 18, 2013

(54) GAME SYSTEM, GAME SYSTEM CONTROL METHOD, AND RECORDING MEDIUM

(75) Inventors: Kazuo Dokei, Kashiba (JP); Osamu Maruyama, Higashiosaka (JP); Hiroaki Kinno, Izumisano (JP); Koji Kitaura, Minamikawachi (JP); Masafumi Yoshida, Kobe (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 76 days.

(21) Appl. No.: 13/066,602

(22) Filed: Apr. 19, 2011

(65) Prior Publication Data

US 2011/0263333 A1    Oct. 27, 2011

(30) Foreign Application Priority Data

Apr. 21, 2010    (JP) .................................. 2010-097988

(51) Int. Cl.
*A63F 9/24*    (2006.01)

(52) U.S. Cl.
USPC ................... 463/42; 463/39; 463/40; 463/41; 463/43

(58) Field of Classification Search
USPC ..................................................... 463/39–43
See application file for complete search history.

(56) References Cited

U.S. PATENT DOCUMENTS

| 7,458,894 B2 * | 12/2008 | Danieli et al. | 463/42 |
| 2003/0220143 A1 * | 11/2003 | Shteyn et al. | 463/42 |
| 2004/0266535 A1 * | 12/2004 | Reeves | 463/42 |
| 2006/0058103 A1 * | 3/2006 | Danieli et al. | 463/42 |

FOREIGN PATENT DOCUMENTS

| JP | 2002-239246 | 8/2002 |
| JP | 2002239246 A * | 8/2002 |
| JP | 2004-229848 | 8/2004 |
| JP | 2004229848 A * | 8/2004 |
| JP | 2005-526581 | 9/2005 |
| JP | 2008-067799 | 3/2008 |

* cited by examiner

*Primary Examiner* — David L Lewis
*Assistant Examiner* — Chase Leichliter
(74) *Attorney, Agent, or Firm* — Jordan and Hamburg LLP

(57) ABSTRACT

A network game system includes a substitution management portion that, when a mid-competition player requests to substitute that player's game operations to a spectator, performs management of a substitution process in which the terminal device of that player is set as a spectating terminal, and the terminal device of the spectator is set as a competing terminal, wherein the spectator who has been substituted for that player by the substitution management portion executes the game operations of that player by operating the terminal device of the spectator.

7 Claims, 23 Drawing Sheets

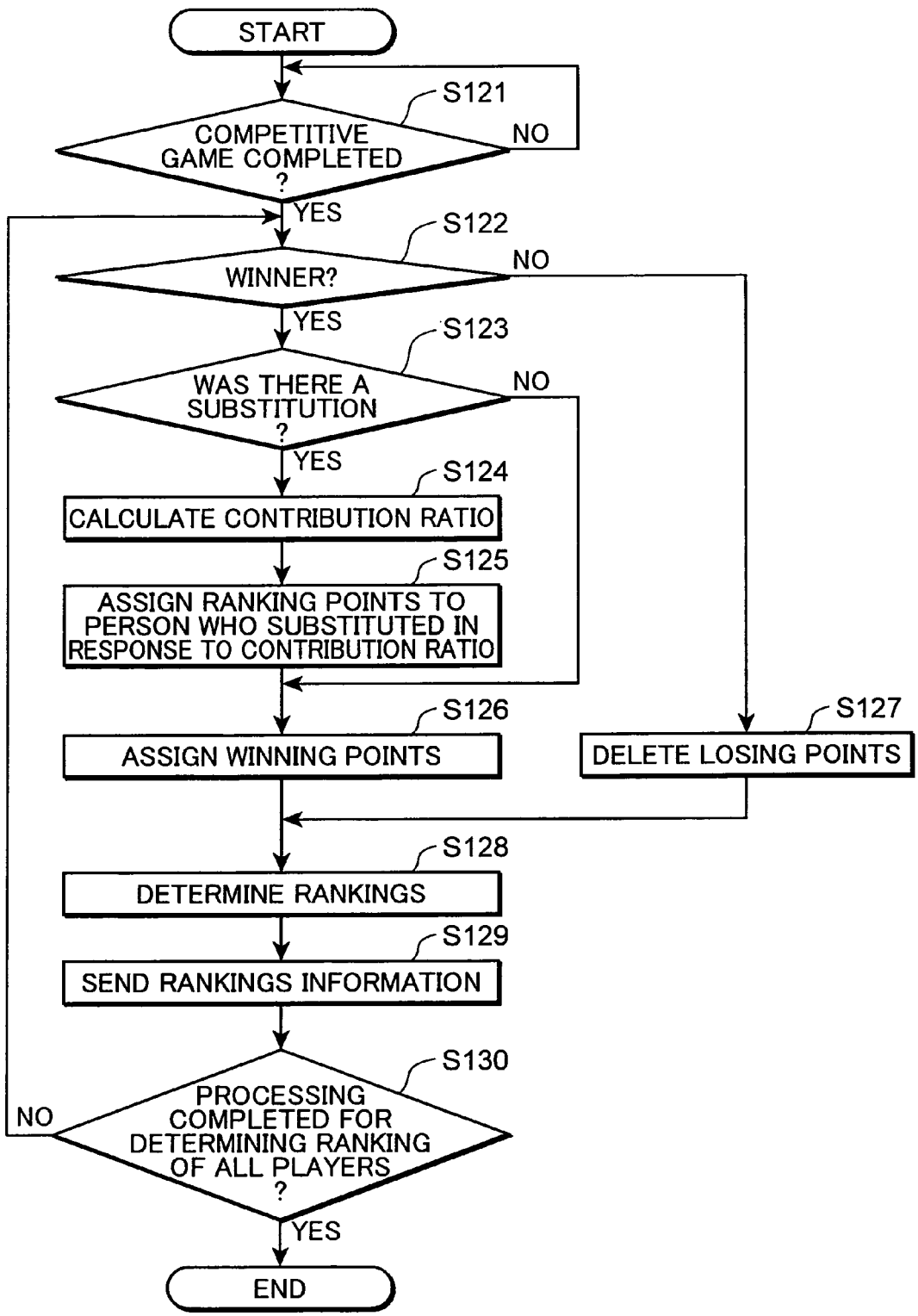

GAME SYSTEM, GAME SYSTEM CONTROL METHOD, AND RECORDING MEDIUM

BACKGROUND OF THE INVENTION

1. Field of the Invention

The present invention relates to a game system for achieving on a computer a communications-based competitive-type network game, to a control method of this game system, and to a recording medium on which a program of this game system is recorded.

2. Description of the Related Art

In recent years, due to increasing speeds of data transfers of internet connections, network games have become widespread in which multiple terminal devices are communicably connected via the internet and players operating these terminal devices compete against each other. Personal computers and home gaming machines and the like are used as the terminal devices, and types of communications-based competitive-type network games that exist include baseball, soccer, combat sports, and various other games.

The above-mentioned communications-based competitive-type network games are achieved by game systems that include multiple terminal devices and a server device respectively connected to a network. Ordinarily, each player using the game system logs into the server device by operating his or her terminal device so that the terminal device is incorporated into the game system. Then, the server device carries out a matching process to determine combinations of opponents from among the multiple logged in terminal devices. After the combinations of opponents have been determined by the server device, the network game is executed by the determined terminal devices directly exchanging data with each other.

Furthermore, in recent years, network game systems have also been proposed (for example, Japanese Translation of PCT Application No. 2005-526581) in which other persons besides the mid-competition player can spectate the mid-competition game status as a spectator via the network.

In this regard, a mid-competition player may become caught in a situation where a game operation unfamiliar to that player must be carried out, and since this player is unaccustomed to this operation, a result may be that the player loses interest in the game itself.

With the network game system of the above-mentioned Japanese Translation of PCT Application No. 2005-526581, a participation level of a spectator to a game is variable and, for example, it is possible to give advice to players. However, there are many cases where it is difficult for a player who has become caught in a situation where an unfamiliar game operation must be carried out to adequately carry out that operation merely by receiving advice, and it is difficult to raise interest in the network game in a player who is caught in such as situation.

SUMMARY OF THE INVENTION

The present invention has been devised in light of the above-described problems, and it is an object therein to provide a game system, a game system control method, and a recording medium on which a program of this game system is recorded that achieve a more highly interesting communications-based competitive-type network game by enabling substitution between a player who has become caught in a situation where an unfamiliar game operation must be carried out and a spectator.

A game system according to one aspect of the present invention is a game system that executes a network game in which, while players who are respectively operating competing terminals including at least two terminal devices are competing against each other via a communications network, a spectator operating a spectating terminal including at least one terminal device can spectate a mid-competition game status via the communications network, and includes a substitution management portion that, when a mid-competition player requests to substitute that player's game operations to the spectator, performs management of a substitution process in which the terminal device of that player is set as a spectating terminal, and the terminal device of the spectator is set as the competing terminal, wherein the spectator who has been substituted for that player by the substitution management portion executes the game operations of that player by operating the terminal device of the spectator.

A game system control method according to another aspect of the present invention is a game system control method that executes a network game in which, while players who are respectively operating competing terminals including at least two terminal devices are competing against each other via a communications network, a spectator operating a spectating terminal including at least one terminal device can spectate a mid-competition game status via the communications network, includes a substitution management step by which, when a mid-competition player requests to substitute that player's game operations to the spectator, management is performed of a substitution process in which the terminal device of that player is set as a spectating terminal, and the terminal device of the spectator is set as the competing terminal.

A recording medium according to still another aspect of the present invention is a recording medium on which a program is recorded that causes a computer included in a game system that executes a network game in which, while players who are respectively operating competing terminals including at least two terminal devices are competing against each other via a communications network, a spectator operating a spectating terminal including at least one terminal device can spectate a mid-competition game status via the communications network, to execute a substitution management function by which, when a mid-competition player requests to substitute that player's game operations to the spectator, management is performed of a substitution process in which the terminal device of that player is set as a spectating terminal, and the terminal device of the spectator is set as the competing terminal.

BRIEF DESCRIPTION OF THE DRAWINGS

FIG. 23 is a flowchart showing an example of competition server operations at a time of competitive game completion in the network game system according to one embodiment of the present invention.

DETAILED DESCRIPTION OF THE PREFERRED EMBODIMENTS OF THE INVENTION

The invention is now described, by way of example, with reference to the accompanying drawings.

Description is given below with reference to the accompanying drawings regarding a network game system according to one embodiment of the present invention.

[Overall Configuration of Network Game System]

Figure 1:
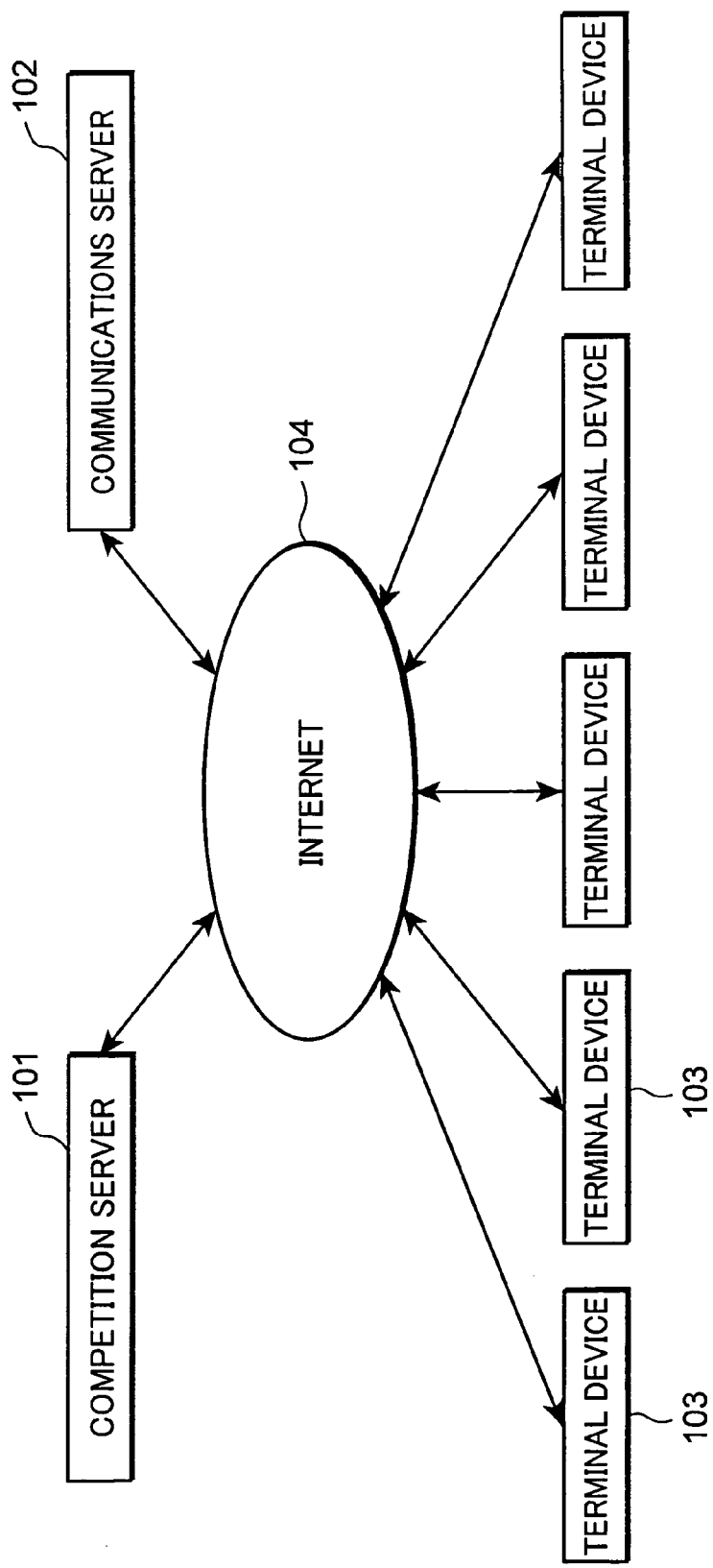
FIG. 1 is a descriptive diagram showing an overall configuration of a network game system according to one embodiment of the present invention.

FIG. 1 is a diagram showing an overall configuration of network game system 100.

As shown in FIG. 1, the network game system 100 according to the present embodiment, on which a communications-based competitive-type network game is executable, is provided with a competition server 101, a communications server 102, and multiple terminal devices 103 that are communicably connected to the competition server 101 and the communications server 102. These devices (the competition server 101, the communications server 102, and the multiple terminal devices 103) are connected by an internet 104 as a communications network.

It should be noted that the communications network in the present embodiment is not limited to the internet 104, and as long as it is capable of enabling communicable interconnections among the competition server 101, the communications server 102, and the terminal devices 103, may be for example a specialized connection, a public connection, or a LAN or the like, or a combination of any of these.

The network game system 100 according to the present embodiment enables competition via the internet 104 among players operating respective competing terminals including at least two terminal devices 103. Further still, the network game system 100 enables a spectator operating a spectating terminal including at least one terminal device 103 during competition by the players to spectate a mid-competition game status via the internet 104.

It should be noted that although multiple terminal devices 103 are present within the network game system 100, a basic configuration of the terminal device 103 is the same, and each of the terminal devices 103 may be a competing terminal for players to compete against each other via the internet 104, and may be a spectating terminal for spectators to spectate a mid-competition game status via the internet 104. Also note that in order to describe separate operations and roles of the multiple terminal devices 103, description is given as appropriate by adding symbols that enable identification of separate terminal devices as necessary as in terminal device A, terminal device B, and terminal device C, and so on.

The terminal device 103 operated by each player participating in the competitive-type network game that is executable in the network game system 100 is configured as a commonly known home gaming machine, a portable game machine, a portable information terminal, a portable phone, or a personal computer or the like. Methods for carrying out competitions among each terminal device 103 operated by a player include a method in which terminal devices 103 compete against each other via direct communications, and a method in which these compete by way of the competition server 101. Competitions are possible with either method, but for the present embodiment description is given first for the former method, that is, for a game system of direct data exchanges among terminal devices 103, a so-called network game using P2P (peer to peer) connections. And description is given later for the latter method, that is, for a game system in which a network game is carried out using so-called client/server (C/S) connections for terminal devices 103 to compete against each other as clients via the competition server 101.

For communications among the terminal devices 103 and the competition server 101, and for communications among the terminal devices 103 and the communications server 102, an HTTP (hyper text transfer protocol) is used that operates on TCP/IP (transmission control protocol/interne protocol) as a base protocol for example, and these can be achieved by implementing an upper order application protocol stipulated by this system.

On the other hand, communications among the terminal devices 103 to be P2P connected can be achieved using an OSI reference model transport layer protocol, mainly the UDP (user datagram protocol) that is implemented in IP protocols. The above-mentioned UDP is a communications method that does not carry out data delivery confirmations or error corrections and simply sends data to other-party terminal devices, and therefore although its level of data reliability is low, it is has the advantage of high speeds in data transfer. Thus, UDP is preferred in communications-based competitive-type network games where large volumes of data are communicated at high speeds in a game environment that demands a high level of real-time performance. It should be noted that naturally it also possible to use existing protocols other than UDP for the communications between a terminal device A and a terminal device B, and also to use new protocols that will be newly stipulated in future.

In the network game system 100, a terminal ID for uniquely identifying each terminal device 103 is assigned to each of the terminal devices 103. Further still, a player ID for specifying each player is assigned to each of the players operating the terminal devices 103. And by associating these sets of identification information (terminal ID and player ID) to carry out the transceiving of data among the terminal devices 103, the competition server 101 manages information relating to each of the terminal devices 103 and each of the players, and executes processes such as opponent deciding processing (matching processing), competition management processing, spectator management processing, substitution management processing, and level management processing, which are described later.

Furthermore, the communications server 102 within the network game system 100 is a server device that handles community formations among the players and among the players and spectators. A player or spectator operating a terminal device 103 can send and receive in real time via the communications server 102 character-based information, for example in a chat format, with a player or spectator operating another terminal device 103. It should be noted that it is also possible for a microphone to be provided in each terminal device 103 such that audio-based information is sent and received in real time among the terminal devices 103 via the communications server 102.

Various communications-based competitive-type network games are available to be achieved on the network game system 100, but one example of these is a baseball game. In a baseball game in which there is a competition between a first team selected by a player A operating a terminal device A and a second team selected by a player B operating a terminal device B, for example, a pitcher character operated by the player A pitches a ball object, and a hitter character operated by the player B hits the ball object that has been pitched. Furthermore, a fielder character operated by the player A catches or passes the ball object that has been hit, and a runner character operated by the player B performs base running. In this manner, description is given below using a baseball game as an example in which the ordinary rules of baseball are applied and the player A and the player B compete to gain points while changing between batting and fielding.

Various forms are conceivable for a system configuration in which it is possible while the players are in mid-competition for a spectator operating a spectating terminal to spectate the mid-competition game status via the internet 104. One example of this is described below with reference to FIG. 10.

Figure 10:
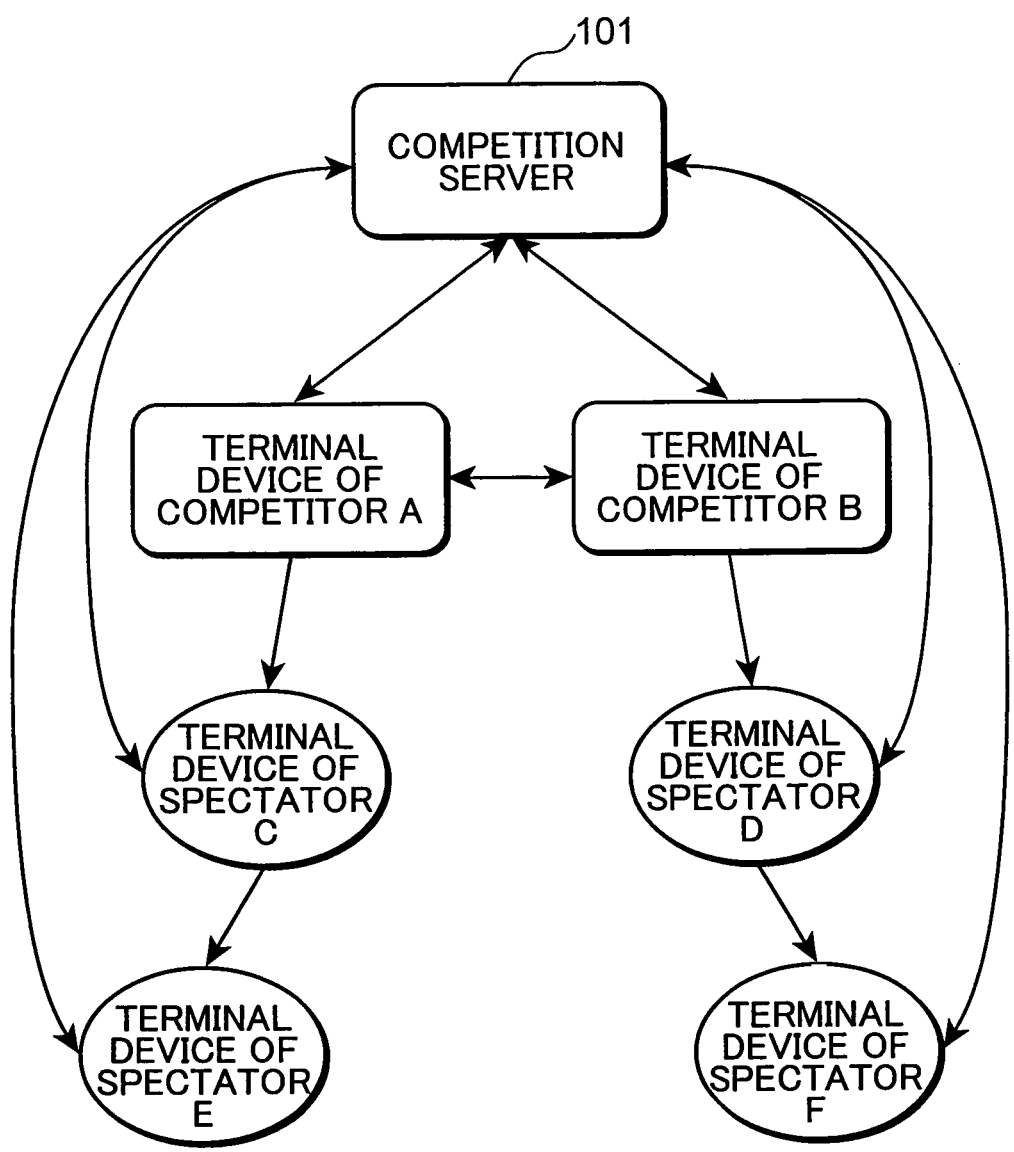
FIG. 10 is a descriptive diagram for describing one example of operations during a player and spectator substitution in the network game system according to one embodiment of the present invention.
Figure 11:
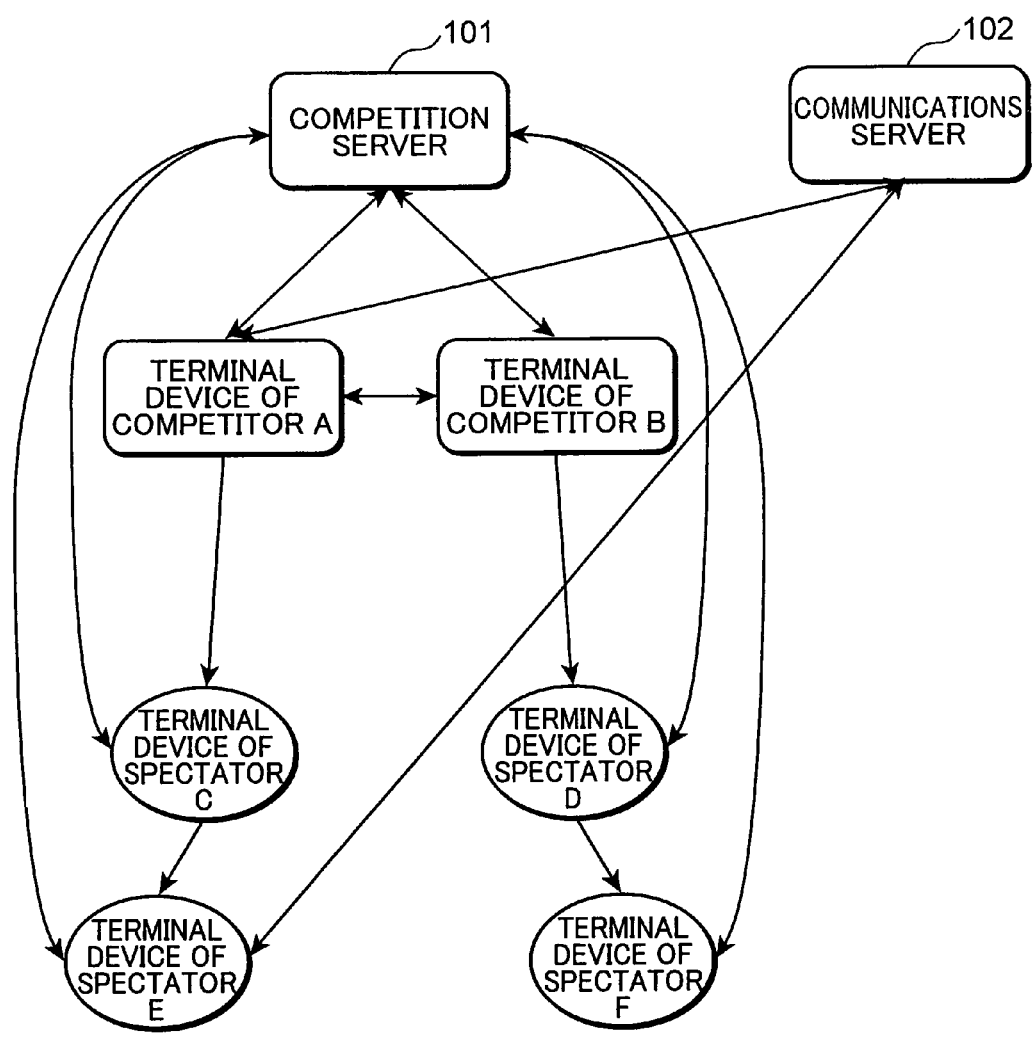
FIG. 11 is a descriptive diagram for describing one example of operations during a player and spectator substitution in the network game system according to one embodiment of the present invention.

FIG. 10 shows an example in which the player A (competitor A) and the player B (competitor B) are matched by the competition server 101, then the terminal device A operated by the player A and the terminal device B operated by the player B are P2P connected as competing terminals via the internet 104. Further still, the example shows that a spectator C and a spectator E are present as spectators on the side of the player A, and a spectator D and a spectator F are present as spectators on the side of the player B. In this case, the terminal device A of the player A and the terminal device C of the spectator C are P2P connected via the internet 104, and newest game status data is transmitted from the terminal device A to the terminal device C.

Game status data includes data such match progression data indicating the progression of the match, and condition data indicating a current condition in a virtual 3D game space. The match progression data includes data such as match time data, played innings data, score data for each team, ball count data, and out count data. The condition data includes data such as data indicating the field of vision and viewing direction of the virtual cameras installed at the baseball ballpark, data indicating the current position, movement direction, and velocity of the ball object, and data indicating the current position, stance, movement direction, velocity, and type of action (for example, a pitching action or a batting action or the like) of an athlete object (a pitcher character, a fielder character, or a runner character). Each of the terminal devices 103 is equipped with a function that displays on a monitor images corresponding to the game status data.

By sending the newest game status data from the terminal device A to the terminal device C as described above using a P2P connection, an equivalent game status image as the terminal device A, which is a competing terminal, is displayed on the monitor of the terminal device C, which is a spectating terminal. Further still, the terminal device C of the spectator C and the terminal device E of the spectator E are P2P connected via the internet 104, and the newest game status data received from the terminal device A is transmitted from the terminal device C to the terminal device E. In this way, an equivalent game status image as the terminal device A, which is a competing terminal, is displayed also on the monitor of the terminal device E, which is a spectating terminal.

In this manner, by distributing the newest game status data in a relay format by linking together and directly connecting the terminal devices using P2P (in the above-described example this is the terminal device A→the terminal device C→the terminal device E), spectating is possible by multiple spectating terminals in a state in which a high level of real-time performance is maintained. Further still, with this method, each of the terminal devices bears in a distributed manner the function of distributing the game status data, and therefore no excessive load is placed on the competition server 101. And with this method, even when attempting to add further spectating terminals, it is possible to maintain a high level of real-time performance and to avoid excessive loads on the competition server 101.

In regard to the order of P2P connections above, this is decided by the competition server 101. Basically, the competition server 101 decides the order of P2P connections when spectating terminals are incorporated into the network game system 100, and thereafter only checks that communications of the spectating terminals are not disconnected, and does not have any actual game status data distribution function. Accordingly, the loads on the competition server 101 stay comparatively small.

It should be noted in relation to the spectating on the side of player B that P2P connections are performed in order of terminal device B→terminal device D→terminal device F in a same manner as above, and that the newest game status data sent from the terminal device B, which is a competing terminal, is distributed to each of the spectating terminals.

Furthermore, as is described later, each of the terminal devices 103 is capable of becoming a spectating terminal at an arbitrary timing as long as it is during competition.

It should be noted that above is illustrated a configuration example in which the game status data is distributed in a relay format by the terminal devices 103, which are linked together and connected using P2P, but there is no limitation to this. For example, there may be a configuration in which the terminal device A, which is a competing terminal, collectively distributes the game status data to all its spectating terminals (the terminal devices C and E in the example of FIG. 10) as a multicast, and the terminal device B, which is a competing terminal, also collectively distributes the game status data to all its spectating terminals (the terminal devices D and F in the example of FIG. 10) as a multicast. Furthermore, any single competing terminal (for example, the terminal device A) may collectively distribute the game status data to all the spectating terminals (the terminal devices C, D, E, and F in the example of FIG. 10) as a multicast.

Furthermore, description is given later regarding a configuration of a system in which the mid-competition game status can be spectated in a game system in which a network game is carried out using client/server (C/S) connections.

Furthermore, the network game system 100 according to the present embodiment enables players who are carrying out a competition and spectators who are spectating the competition via the internet 104 to substitute each other during the network competition. That is, when a mid-competition player requests to substitute that player's character operations (operations in the game) to a spectator, a substitution process is achieved in which the terminal device of that player is set as a spectating terminal, and the terminal device of the spectator is set as a competing terminal. And it is possible for the spectator who has substituted the player to execute the character operations of that player by operating the spectator's terminal device 103.

For example, when a player taking part in a competition is in a situation during the competition where he is forced to conduct character operations that are unfamiliar to him, he is able to request substitution with another person (a friend or acquaintance or other person) who is spectating that competition. In this case there is no change in the player character itself that is moving on the game screen, but rather the person who is operating the character changes from the player to the spectator. Furthermore, it is also possible for the spectator who has substituted character operations with the player to again substitute with the player or another spectator. That is, it is possible for substitutions of character operations to be conducted multiple times.

Detailed description is given below of configurations of each device within the network game system that achieves the above-described substitution of character operations.

[Configuration of each Device within Network Game System]

Figure 3:
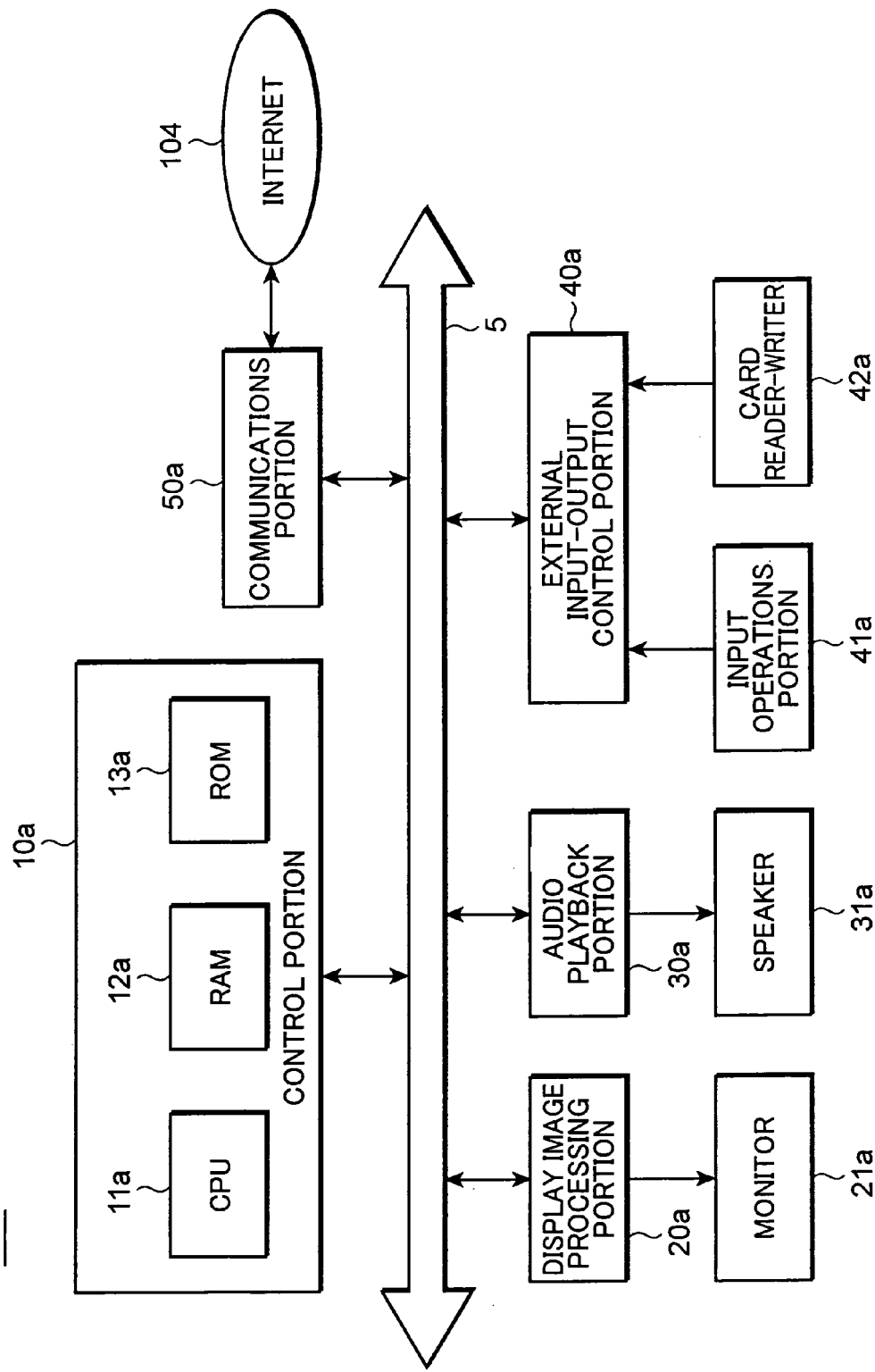
FIG. 3 is block diagram showing a hardware configuration of a terminal device that constitutes a network game system according to one embodiment of the present invention.

As shown in FIG. 3, the terminal device 103 is provided with a control portion 10a, a display image processing portion 20a, an audio playback portion 30a, an external input-output control portion 40a, and a communications portion 50a, and these are connected to each other by a bus 5.

As shown in FIG. 3, the control portion 10a controls overall operations of the terminal device 103 and is provided with an information processing unit (CPU) 11a that carries out processing relating to general game progression and image display processing as well as other various types of information processing, a RAM (random access memory) 12a that temporarily stores information and the like during processing, and a ROM 13a on which is stored in advance various types of programs, and these are connected to each other by the bus 5.

Stored in the ROM 13a are program data of an operating system (OS), image data, audio data, and game data constituted by various types of program data. Examples of image data recorded in the ROM 13a include data of pitcher characters, hitter characters, fielder characters, runner characters, background images, images or the like of various types of operation screens and settings screens. Furthermore, image data of pitcher characters and hitter characters and the like is constituted by a required number of polygons for constituting these so that they can be rendered three-dimensionally.

Then, based on the operating system recorded in the ROM 13a, which is inbuilt or detachably mounted, the CPU 11a reads out data from the ROM 13a such as image data, audio data, control program data, and game program data. A portion or all of the data that has been read out is held in the RAM 12a. Thereafter the CPU 11a carries out various types of data processing based on the control programs and various types of data (such as image data including polygons of display objects, textures, and various text images and audio data and the like), which are stored in the RAM 12a.

The above-mentioned data processing includes processing such as processing for 3D space calculations, processing for position conversion calculations from the 3D space to a pseudo 3D space, processing for light source calculations, and processing for generating and reprocessing image and audio data.

Among the various data stored on the ROM 13a, data that can be stored on detachable recording media may be readable for example by various types of drive units such as a hard disk drive, an optical disk drive, a flexible disk drive, a cassette media reading device or the like. In this case, examples of recording media that can be used include hard disks, optical disks (CD-ROM, DVD-ROM, UMD or the like), flexible disks, semiconductor memories, ROM cassettes, or cartridges or the like for home video game machines.

The display image processing portion 20a is provided with components such as interface circuitry and a D/A converter (digital-to-analog converter), and displays for example image data that is written in the RAM 12a and image data that is read out from the ROM 13a on the monitor 21a, which is a liquid crystal display or the like, in accordance with image display instructions from the CPU 11a.

The audio playback portion 30a generates audio messages, sound effects, and musical composition data and the like that are required to be generated during the progression of the game in accordance with instructions from the CPU 11a, and outputs these to a speaker 31a.

The external input-output control portion 40a includes interface circuitry and the like, and carries out input-output control of data between the control portion 10a and an input operations portion 41a, and between the control portion 10a and a card reader-writer 42*a*. For example, the external input-output control portion 40*a* converts operation detection signals inputted from the input operations portion 41*a* to digital signals that can be processed by the control portion 10*a*. The input operations portion 41*a* is constituted by components such as a keyboard, mouse, and controller for home video game machines and the like for enabling input of various operational commands from the player A.

The communications portion 50*a* is provided with interface circuitry for communications information and a communications modem or the like, and performs transceiving of various types of data via the internet 104 between itself and the competition server 101, and between itself and the terminal device B of an opponent.

Figure 2:
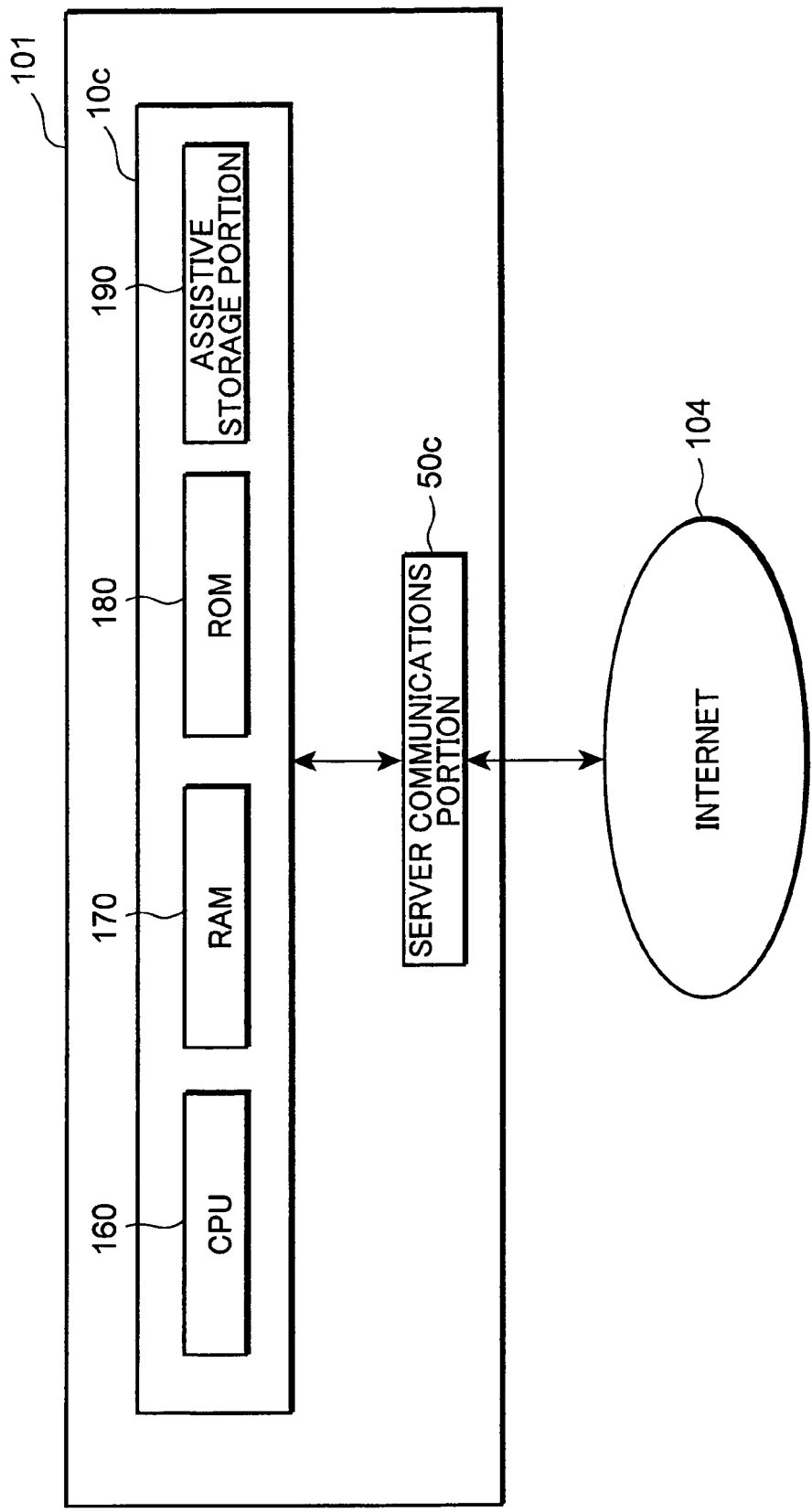
FIG. 2 is block diagram showing a hardware configuration of a competition server that constitutes a network game system according to one embodiment of the present invention.

Next, description is given of a configuration of the competition server 101. As shown in FIG. 2, the competition server 101 is a computer provided with a server control portion 10*c* and a server communications portion 50*c*.

The server control portion 10*c* controls overall operations of the competition server 101 and is provided with an information processing unit (CPU) 160, a RAM 170 that temporarily stores information and the like during processing, a ROM 180 on which is stored in advance predetermined programs and the like, and an assistive storage portion 190 such as a hard disk device or an optical disk device. The operating system (OS), various programs, and various settings data recorded in the ROM 180 and the assistive storage portion 190 are loaded into the RAM 170, and each function of the competition server 101 is achieved by the CPU 160 sequentially executing the programs in the RAM 170.

The server communications portion 50*c* is provided with interface circuitry for communications information and a communications modem or the like, and carries out transceiving of various types of data via the internet 104 between itself and each of the terminal devices A and B and so on.

Next, description is given of a configuration of the communications server 102. The communications server 102 is equivalent to the competition server 101 and is a computer provided with a server control portion and a server communications portion. A basic hardware configuration of the communications server 102 is equivalent to that of the competition server 101 shown in FIG. 2, and therefore an illustration thereof is omitted.

Figure 4:
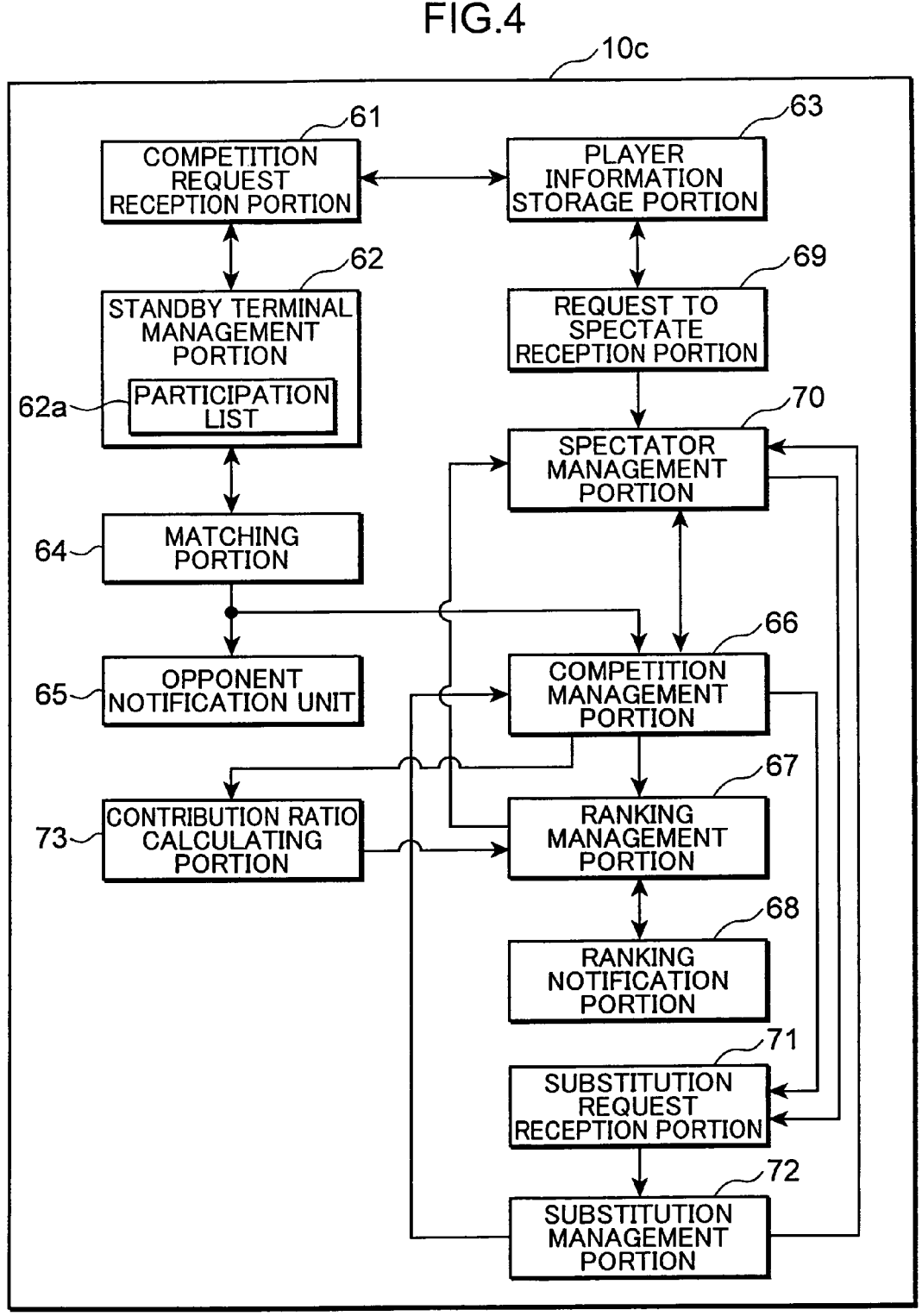
FIG. 4 is a functional block diagram of a control portion of the competition server according to one embodiment of the present invention.
Figure 6:
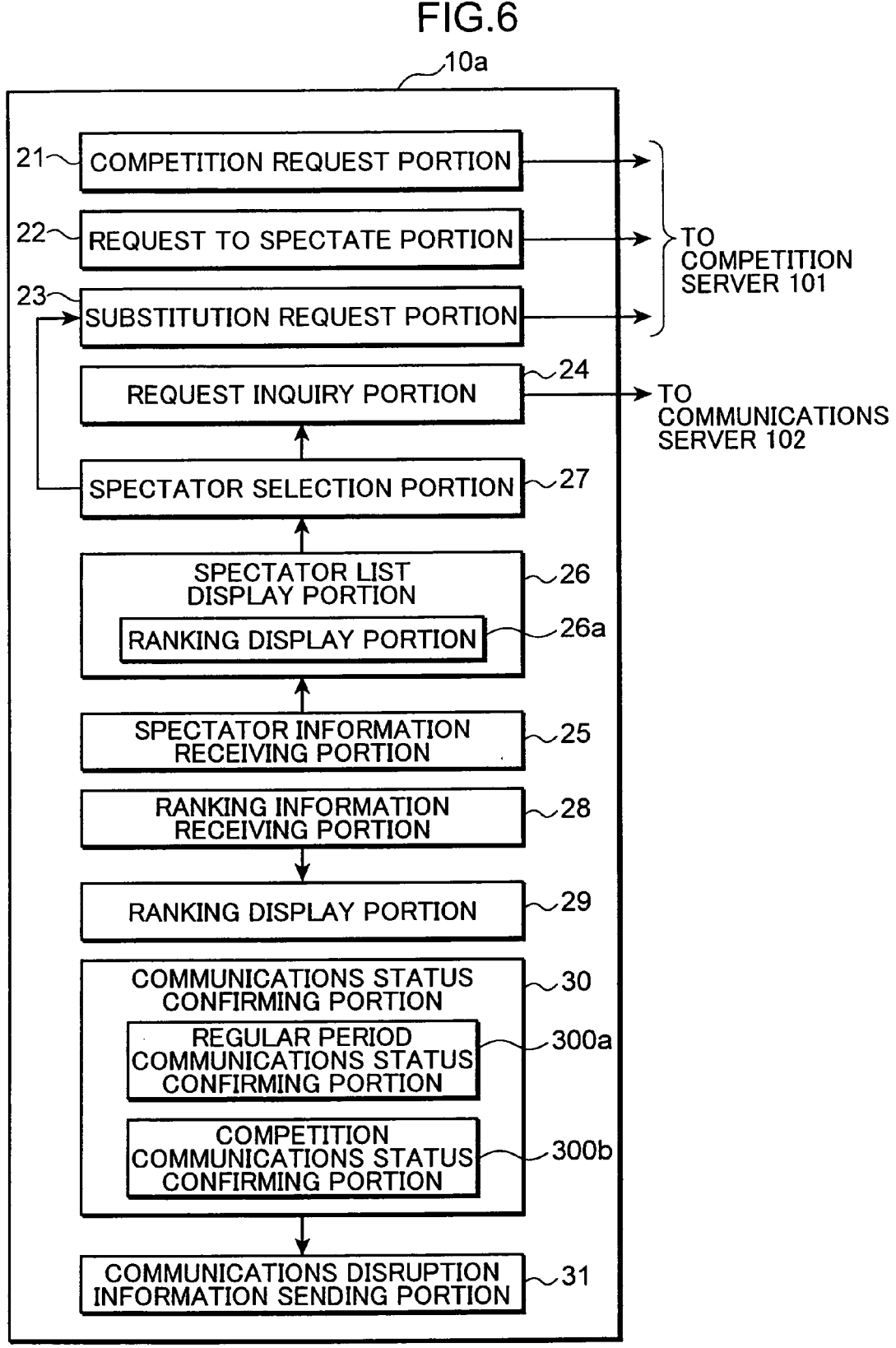
FIG. 6 is functional block diagram of a control portion in the terminal devices that constitute the network game system according to one embodiment of the present invention.

Next, description is given below regarding functional configurations of the terminal device 103 and the competition server 101. FIG. 4 is a functional block diagram of the server control portion 10*c* of the competition server 101. FIG. 6 is a functional block diagram of the control portion 10*a* of the terminal device 103. First, description is given regarding main functions of the competition server 101. The competition server 101 has functions such as a login authentication function, a matching function, a competition management function, a spectator management function, a substitution management function, and an ability evaluation level (such as virtual ranking, rewards, honors, and grades or the like) management function.

The above-mentioned login authentication function is a function by which login authentication is carried out by determining a presence/absence of a game participation qualification and a spectating qualification of each user when users desiring to participate in or spectate a communications-based competitive-type network game attempt to log into the competition server 101 by operating the terminal device 103. For example, member authentication is performed in a case of a game that is a member-restricted online service.

The above-mentioned matching function is a function by which combinations of opponents are determined from groups of terminals that have requested a competition constituted by multiple terminal devices that are requesting a competition.

The above-mentioned competition management function is a function by which, when a competitive game is being executed among multiple terminal devices 103, the communications status of each of the terminal devices 103 is checked until that competitive game is completed, and management is performed as to whether or not competition is ongoing.

The above-mentioned spectator management function is a function by which mid-competition spectators are specified and listed, the communications status of the terminal device of each of the spectators is checked, and management is performed as to whether or not spectating is ongoing.

The above-mentioned substitution management function is a function by which, when a mid-competition player requests to substitute that player's game operations to a spectator, management is performed of a substitution process in which the terminal device 103 of that player is set as a spectating terminal, and the terminal device 103 of the spectator is set as a competing terminal.

The above-mentioned ability evaluation level management function is a function by which an ability evaluation level (such as virtual ranking, rewards, honors, and grades or the like) to be assigned to each player is decided by accumulatively evaluating the game results of. each player up to the current time, and management is performed by associating this ability evaluation level to identification information (terminal ID or player ID) of the terminal devices A and B. In the present embodiment, illustration is given of an example in which a ranking is used as the ability evaluation level managed by the competition server 101. Furthermore, the competition server 101 may also have a function of calculating global rankings, national rankings, or specified regional rankings based on the ability evaluation level of the players.

It should be noted that the above-mentioned login authentication function, matching function, competition management function, spectator management function, substitution management function, and ability evaluation level management function may be achieved anywhere within the network game system 100, and therefore it is not absolutely necessary for these to be achieved in any single competition server 101. For example, a portion of these functions can be achieved by being divided among a plurality of function distribution type servers. For convenience, the present embodiment is described regarding a configuration example in which these functions are all held by the competition server 101 and this competition server 101 performs consolidated management.

As shown in FIG. 4, the server control portion 10*c* of the competition server 101 is provided with a competition request reception portion 61, a standby terminal management portion 62, a player information storage portion 63, a matching portion 64, an opponent notification portion 65, a competition management portion 66, a ranking management portion 67, a ranking notification portion 68, a request to spectate reception portion 69, a spectator management portion 70, a substitution request reception portion 71, a substitution management portion 72, and a contribution ratio calculating portion 73.

The competition request reception portion 61 receives identification information (individual information such as terminal ID and player ID or the like) of each of the terminal devices 103 when each player desiring to participate in the network game attempts to log into the competition server 101 by operating his or her terminal device 103. And based on the player information stored in the player information storage portion 63, the competition request reception portion 61 references the terminal ID and the player ID to perform reception of participation of each player into the game, thereby achieving the above-described login authentication function.

The standby terminal management portion 62 manages the terminal devices 103 whose participation has been received as a group of terminals requesting competition until a time when combinations of opponents are decided, and performs management by registering the group of terminals requesting competition in a participation list 62*a*. The group of terminals requesting competition registered in the participation list 62*a* is subjected to matching processing by the matching portion 64.

The matching portion 64 achieves the above-mentioned matching function and carries out a matching process of determining combinations of opponents from among the group of terminals requesting competition registered in the participation list 62*a*. Various methods are available for the matching process by the matching portion 64, but in the present embodiment description is given regarding an example in which a matching grade method is applied, whereby the matching portion 64 carries out matching based on a matching grade of each player. Here, matching grade refers to a numerical value that is an indicator of a player's strength (level of game proficiency), and fluctuates in response to competition results. With this method, the matching portion 64 matches against each other terminal devices (players) that have proximal matching grades among the group of terminals requesting competition registered in the participation list 62*a*. Alternatively, the player may be able to arbitrarily select a corresponding matching grade mode in which the matching grades are used, and a non-corresponding matching grade mode in which the matching grades are not used, such that the corresponding matching grade mode is selected only in a case where the player desires matching limited to players having a strength (game proficiency) proximal to his or her own. In this case, the matching portion 64 ordinarily (in the case of the non-corresponding matching grade mode) carries out matching by randomly selecting from among the group of terminals requesting competition, but in a case where the corresponding matching grade mode has been selected by the player, the matching portion 64 matches players having proximal matching grades against each other. In a case where players having too great a difference in game proficiency compete against each other, no intense game progression can be expected, which sometimes results in a loss of interest in the game. Consequently, if the above-mentioned matching grade method matching is applied, it becomes easier to match players against each other having proximal levels of proficiency, and interest in the game can be increased.

It should be noted that it is possible for matching grades to be confirmed by each player on the screen of his or her terminal device, but matching grades are mainly used in the matching process by the matching portion 64, and rankings and ranking points are managed separately.

The opponent notification portion 65 gives notification of opponent information respectively to a first terminal device (hereinafter described as the terminal device A) and a second terminal device (hereinafter described as the terminal device B), which have been matched by the matching portion 64. That is, the opponent notification portion 65 extracts information relating to the player B of the opponent terminal device B from the player information storage portion 63 and sends this information to the terminal device A. Furthermore, the opponent notification portion 65 extracts information relating to the player A of the opponent terminal device A from the player information storage portion 63 and sends this information to the terminal device B.

While a competitive game is being executed between the terminal device A and the terminal device B, the competition management portion 66 manages the communications status of both the terminal devices until that competitive game is completed. Specifically, the terminal device A and the terminal device B intermittently transmit regular period data (heartbeats) to the competition server 101 while the competitive game is being executed on a P2P connection, and the competition management portion 66 of the competition server 101 determines that the competitive game is being executed without problem by the terminal devices A and B while heartbeats are being received from the terminal devices A and B. On the other hand, in a case where reception of a heartbeat has not been achieved within a predetermined time (for example, 10 seconds), the competition management portion 66 determines that communications have been cut with the terminal device that had been transmitting the heartbeat. For example, in a case where reception of the heartbeat from the terminal device A has stopped, but reception of the heartbeat from the terminal device B is ongoing, the competition management portion 66 can determine that the terminal device A has cut communications in mid-competition. Furthermore, in this case, an abnormal completion notification to the effect that "the terminal device A has cut communications in mid-competition" is performed from the terminal device B to the competition server 101, and therefore the competition server 101 can reliably determine from this abnormal completion notification that the terminal device A has cut communications in mid-competition.

Furthermore, in a case where the competitive game has been completed normally, a normal completion notification including competition result information (win-loss information and the like) is carried out to the competition server 101 from either or both of the terminal device A and the terminal device B. In a case where the normal completion notification or the above-mentioned abnormal completion notification has been received, the competition management portion 66 removes the terminal device A and the terminal device B from the competition management targets. It should be noted that in a case where a network interruption has occurred such when the network becomes abnormally congested due to increases in traffic, it is possible that the heartbeats from both the terminal device A and the terminal device B are disrupted at the same time, however even in this case, the competition management portion 66 is able to remove both the terminal devices A and B from the competition management targets.

The ranking management portion 67 achieves the above-mentioned ability evaluation level management function and is provided with a storage region for associating and storing the "ranking" and "ranking points" of each player with the identification information (terminal ID and player ID) of the terminal device, and updates the rankings and ranking points based on the competition result information each time a competitive game is completed.

Here, ranking refers to one type of ability evaluation level indicating the level (strength) of ability of players in multiple grades, an example of this being 20 grades of ranking assigned to the players from zero, which is the weakest ranking, to 19, which is the strongest ranking. It should be noted that the rankings are not limited to this, and for example it is possible to set 19 or less grades or 21 or more grades. Furthermore, ranking points refers to a fluctuation standard of rankings. For example, this can be set such that each player starts from zero ranking points (points held: zero), and the ranking rises by one when the ranking points reach a predetermined number of positive points, and the ranking drops by one when the ranking points reach a predetermined number of negative points.

Furthermore, the ranking management portion 67 is configured such that when the competition between the player A of the terminal device A and the player B of the terminal device B is completed normally, a predetermined number of winning points (for example, winning points corresponding to a ranking difference between the players) is added to the ranking points of the player who has won, while a predetermined number of losing points (for example, losing points corresponding to a ranking difference between the players) is subtracted from the ranking points of the player who has lost.

Further still, in a case where a spectator who has substituted a mid-competition player has carried out game operations of that player, the ranking management portion 67 as a point assigning portion assigns ranking points (merit points) to the spectator in response to the contribution ratio (a value indicating a degree of contribution to a game of a spectator) obtained by the contribution ratio calculating portion 73, which is described later. In this case, the ranking management portion 67 may be configured to assign to the winning player an amount of points in which ranking points (merit points) assigned to the spectator in response to the contribution ratio of the spectator are deducted from the winning points obtained by the winning player due to being substituted by the spectator.

The ranking management portion 67 stores information relating to the above-mentioned rankings and information of the winning points and the losing points in a nonvolatile memory, and references these sets of information while carrying out the above-described operations.

The ranking notification portion 68 has a function of sending rankings after completion of a competition to the terminal device A and the terminal device B. In this way, the player A of the terminal device A and the player B of the terminal device B can confirm on their screens their own rankings after completion of a competition. Further still, the ranking notification portion 68 may have a function such that, based on the ranking and ranking points of each player, it calculates global rankings, national rankings, or specified regional rankings, then sends the rankings after completion of the competition to the terminal device A and the terminal device B, and for players who have entered a higher order of ranking, enables registration of information as name or the like of that player. In this way, the player A of the terminal device A and the player B of the terminal device B can confirm or the like on their screens their own rankings after completion of a competition.

In a case where a user desiring to spectate a mid-competition game has carried out a request to spectate (sent a command requesting to spectate) to the competition server 101 by operating the terminal device 103, the request to spectate reception portion 69 receives the command requesting to spectate and performs reception of game spectating such that the terminal device 103 of this user (spectator) is set as a spectating terminal.

The spectator management portion 70 manages terminal devices 103 whose spectating has been received as a group of spectating terminals. In a case where multiple spectating terminals exist and it is necessary to link these together serially with competing terminals using P2P connections as shown in FIG. 10, the spectator management portion 70 determines the order of these P2P connections.

When a person desiring to spectate requests to spectate while specifying a competing terminal, the spectator management portion 70 is configured to connect the terminal device 103 of the person desiring to spectate as a spectating terminal to a series that is serially connected to the competing terminal. In this way, the terminal device 103 of the person desiring to spectate then joins the series that is serially connected to the competing terminal of the player (competitor) who the spectator wants to support (or the player who the spectator thinks he or she would like to substitute).

Furthermore, when a new person desiring to spectate requests to spectate while specifying a competing terminal, it is preferable that the spectator management portion 70 connects the terminal device 103 of the new person desiring to spectate as a spectating terminal to a further lower position than the most downstream connected terminal device 103 of the series that is serially connected to the competing terminal. In this way, there is no switching of order in the P2P connections of the spectating terminals of the spectators who are already spectating within the series, and by connecting the terminal device 103 of the new spectator to the most downstream terminal device 103 of the series, it is possible for a new spectator to be incorporated as a spectating terminal easily and quickly.

Furthermore, the spectator management portion 70 manages the communications status of the spectating terminals until the spectating by the spectators is completed (until the competitive game is completed in a case where the spectating by the spectator is not completed midway). Specifically, each of the spectating terminals intermittently transmits regular period data (heartbeats) to the competition server 101 while reception of game status data is received (or transceived) using a P2P connection, and the spectator management portion 70 of the competition server 101 determines that receiving (or transceiving) of the game status data is being executed without problem by the spectating terminal while heartbeats are being received from that spectating terminal.

On the other hand, in a case where reception of a heartbeat has not been achieved within a predetermined time (for example, 10 seconds), the spectator management portion 70 determines that communications have been cut with the spectating terminal that had been transmitting the heartbeat. In a case where there is a spectating terminal whose communications have been disrupted, the spectator management portion 70 re-determines the order of the linked-together P2P connections as necessary so that the spectating can continue by spectating terminals for which communications have not been disrupted.

When a mid-competition player requests (sends a substitution request command) for substitution of that player's game operations to a spectator, the substitution request reception portion 71 receives the substitution request command and performs reception of that substitution request.

The substitution management portion 72 manages the substitution process such that the terminal device 103 of the player whose substitution request has been received is set as a spectating terminal, and the terminal device 103 of the spectator is set as a competing terminal. And it is possible for the spectator who has substituted the player according to the substitution management portion 72 to execute via the internet 104 the character operations of that player by operating the spectator's terminal device 103. Furthermore, the substitution management portion 72 can perform management of the substitution process so that, with respect to a mid-competition player, only spectators of terminal devices 103 in the series that is serially connected to the competing terminal of that player are permitted to perform substitution. Description is given later regarding a further detailed configuration of the substitution management portion 72.

The contribution ratio calculating portion 73 obtains the contribution ratio indicating a degree of contribution to a game of a spectator who has substituted the mid-competition player and carried out character operations of that player. Various forms are conceivable for calculating this contribution ratio.

For example, a contribution ratio can be calculated in a case where points have been obtained due to substitution in an attacking scene, and the contribution ratio can be set to zero in a case where no points were able to be obtained. Furthermore, a contribution ratio can be calculated in a case where points by the opponent have been prevented due to substitution in a defensive scene, and the contribution ratio can be set to zero in a case where points were surrendered to the opponent. Furthermore, a contribution ratio can be calculated in a case where a match was won due to the substitution, and the contribution ratio can be set to zero in a case where the match was lost.

Furthermore, in a case where the contribution ratio is calculated, the contribution ratio can be obtained based on a number of innings in which substitution occurred. For example, in case where there was substitution in three innings within one match (nine innings), the contribution ratio can be set at 0.33 (33%). Or in a case where points were won due to the substitution, the contribution ratio can be obtained based on the points won due to the substitution with respect to the total points won. For example, in case where two points were won due to substitution among a total of five points that were won in one match, the contribution ratio can be set at 0.40 (40%). The methods of calculating the contribution ratio that are described here are merely single examples, and various other forms are conceivable besides these.

Figure 5:
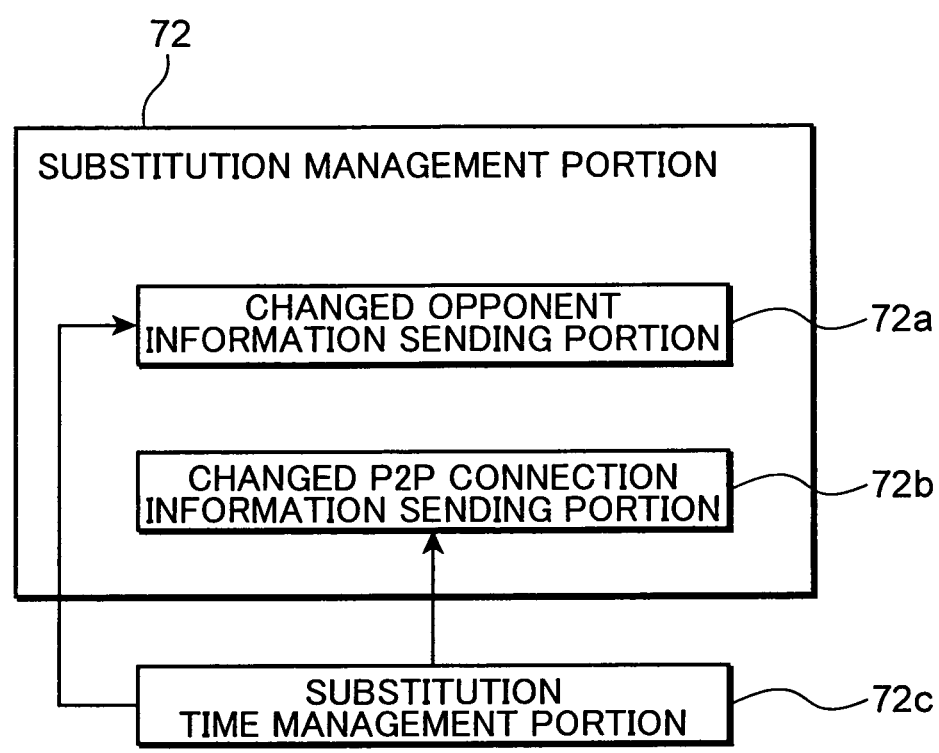
FIG. 5 is a functional block diagram showing a configuration of the substitution management portion in the control portion shown in FIG. 4.

Next, description is given based on FIG. 5 of a further detailed configuration of the substitution management portion 72. The substitution management portion 72 includes a changed opponent information sending portion 72a, a changed P2P connection information sending portion 72b, and a substitution time management portion 72c.

The changed opponent information sending portion 72a sends changed opponent information to the terminal device B of the player (for example, the competitor B) who is competing with the player (for example, the competitor A) who has requested substitution giving indication to the effect the opponent has changed from the competitor A to a spectator (for example, the spectator E). The changed opponent information includes identification information (terminal ID and player ID) relating to the spectator who is substituting. And upon receiving this changed opponent information, the terminal device B of the competitor B cancels its P2P connection with the terminal device A of the competitor A, and carries out a new P2P connection with the terminal device E of the spectator E.

Figure 14:
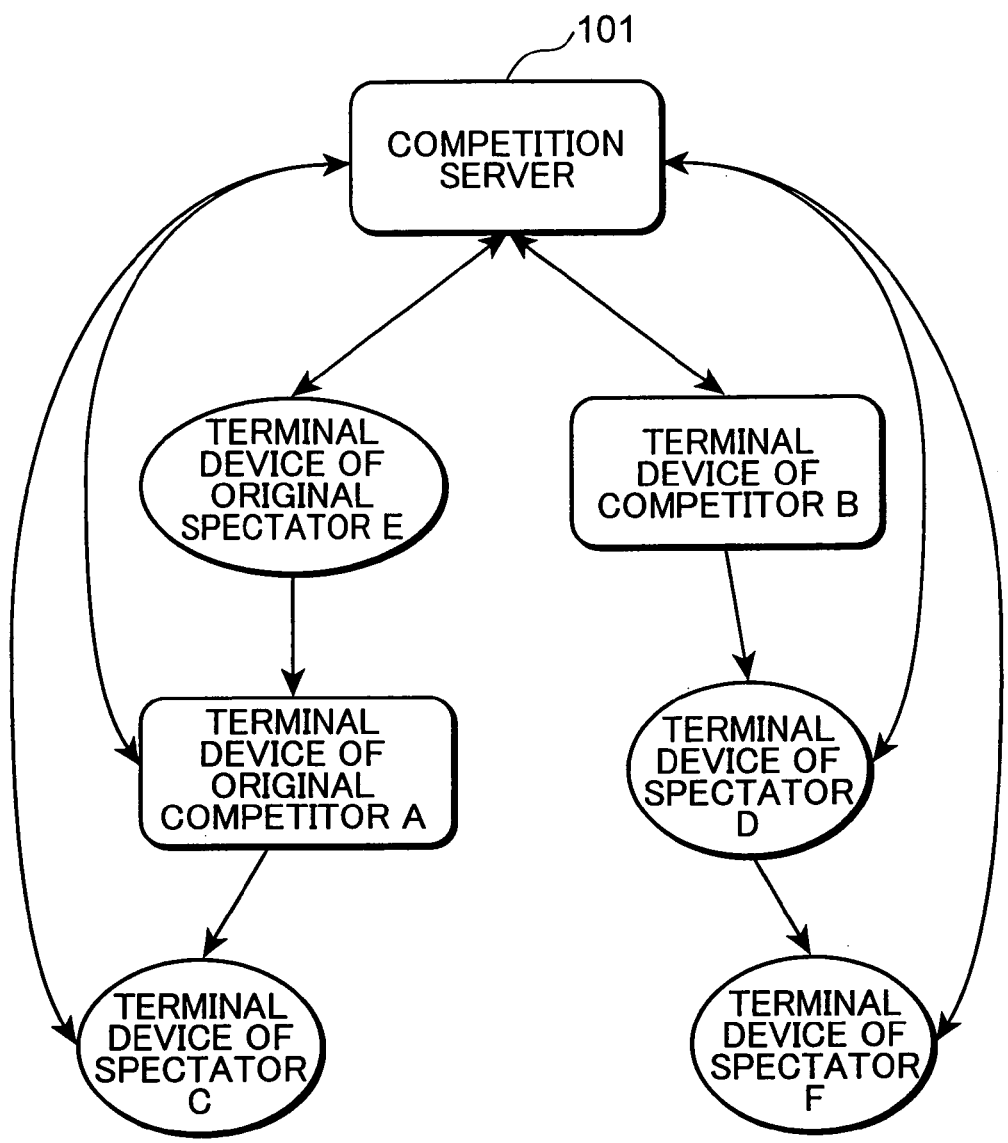
FIG. 14 is a descriptive diagram for describing one example of operations during a player and spectator substitution in the network game system according to one embodiment of the present invention.

In this regard, accompanying the substitution of the competitor A by the spectator E, it becomes necessary to change the order of the terminal devices 103 that are linked together and connected using P2P shown in FIG. 10. Accordingly, the changed P2P connection information sending portion 72b sends changed P2P connection information indicating to each terminal device that the P2P connection has changed. In the above-described example, by having the changed P2P connection information sending portion 72b send changed P2P connection information to the terminal devices A, C, and E, the order of linked together P2P connections changes to terminal device E→terminal device A→terminal device C as shown in FIG. 14 for example.

The substitution time management portion 72c carries out time management in the process of substituting from a player to a spectator, and in case where substitution processing has not been completed despite the lapsing of a predetermined substitution processing time limit, it assumes a failed substitution and carries out processing of returning the competition to between the original players. The substitution time management portion 72c can manage the substitution processing time limit based on an internal clock for example. The commencement of time management of the substitution process by the substitution time management portion 72c can be set as a time point when the competition server 101 has performed reception of the substitution process from the player to the spectator.

It should be noted that in a case where the substitution process is to be carried out from a player to a spectator, it is preferable that the player calls a timeout in advance and that the match is temporarily paused. By doing this, the substitution process can be executed from the player to the spectator with an equivalent feeling to a real match and without any sense of strangeness to the opponent. In this case, the commencement of time management of the substitution process by the substitution time management portion 72c can be set to a commencement time of the temporary pause in the match due to the timeout.

Next, description is given regarding main functions of the terminal device 103. As shown in FIG. 6, the control portion 10a of the terminal device 103 is provided with a competition request portion 21, a request to spectate portion 22, a substitution request portion 23, a request inquiry portion 24, a spectator information receiving portion 25, a spectator list display portion 26, a spectator selection portion 27, a ranking information receiving portion 28, a ranking display portion 29, a communications status confirming portion 30, and a communications disruption information sending portion 31.

The competition request portion 21 sends a competition request command to the competition server 101 to carry out a competition request. Appended to the competition request command is identification information (terminal ID and player ID) of the terminal device 103 that is requesting a competition.

The request to spectate portion 22 carries out a request to spectate (sends a request to spectate command) with respect to the competition server 101. The terminal device 103 that is logging in to the competition server 101 is capable of confirming on its screen a mid-competition list (a list of competitor currently carrying out competitions), and can specify the game of which competitor to spectate. Appended to the command requesting to spectate is identification information (terminal ID and player ID) of the spectator and identification information (terminal ID and player ID) of the competitor targeted to be spectated.

The substitution request portion 23 carries out a substitution request (sends a substitution request command) with respect to the competition server 101. Appended to the substitution request command is identification information (terminal ID and player ID) of the player and identification information (terminal ID and player ID) of the spectator targeted for substitution.

The request inquiry portion 24 inquires about substitution to spectators who desire substitution via the communications server 102. A form of this substitution inquiry includes a chat format in which a text based conversation can be carried out in real time. In a case of a chat format substitution inquiry, for example, the player who is the inquirer sends an arbitrary comment (substitution inquiry information) such as "please substitute operations with me" via the communications server 102 to a spectator who desires substitution. In response to this, the spectator replies with an arbitrary comment (substitution acceptance information) such as "all right" to the terminal device 103 of the player via the communications server 102. It should be noted that in a case where the spectator does not desire substitution, it is also possible to reply with an arbitrary comment (substitution refusal information) such as "I don't want to substitute" to the terminal device 103 of the player via the communications server 102.

Another form of substitution inquiry includes a command format in which an inquiry command (substitution inquiry information) is sent to a spectator who desires substitution via the communications server 102. In this case, information indicating the substitution inquiry from the player is displayed on the display screen of the spectator who has received the substitution inquiry command, and in response to this inquiry, the spectator replies with a substitution acceptance command (substitution acceptance information) to the terminal device 103 of the player via the communications server 102 by carrying a predetermined button operation or a pointing device operation or the like. It should be noted that in a case where the spectator does not desire substitution, it is also possible to reply with a substitution refusal command (substitution refusal information) to the terminal device 103 of the player via the communications server 102.

The spectator information receiving portion 25 receives spectator information via the internet 104 from the spectator management portion 70 of the competition server 101.

Based on the received spectator information, the spectator list display portion 26 displays on the display screen of the terminal device 103 of the players (competitors) who are competing a list of spectators who are spectating the competition. In the example of FIG. 10, information of the spectators C, D, E, and F is displayed on the display screen of the terminal device A, and information of the spectators C, D, E, and F is also displayed on the display screen of the terminal device B.

Various forms are conceivable for the display format for listing spectators. For example, a spectator list screen (window) may be called out from the game screen in mid-competition so as to display a list of spectators. Alternatively, it is also possible to constantly display spectators on the game screen in mid-competition. One example of this that is conceivable is displaying characters of the spectators in the stands of the ballpark (such as avatars, which are characters that appear on the screen as the spectators themselves). In this way, by displaying characters of the spectators within the game screen in mid-competition, the awareness of the spectator of participating in the game (the awareness of participating as a spectator) is heightened, which enables interest in the game to be improved and also enables the players to easy and swiftly determine who is present as spectators.

Furthermore, the spectator list display portion 26 is provided with a ranking display portion (ability evaluation level display portion) 26a that combines and displays rankings (ability evaluation levels) indicating the level of game operational ability of each spectator with the above-described spectator list. In this way, a player (competitor) who is carrying out a competition can select spectators who desire substitution while confirming the ranking of each spectator. Accordingly, the player is then able to refer to the rankings displayed by the ranking display portion 26a to select a spectator who desires substitution, not only in regard to friends and acquaintances whose game operational ability the player knows in advance, but also in regard to spectators for which the player has no advance knowledge whatsoever.

The spectator selection portion 27 executes a selection process of spectators desiring substitution from among the spectator list displayed on the screen by the spectator list display portion 26. For example, by carrying out a predetermined button operation or pointing device operation or the like with respect to the displayed spectator list, the player can select a spectator who desires substitution. In particular, this is desirable in a case of a format in which a character (avatar or the like) of the spectators is displayed in the game screen in mid-competition, since there is no need to switch screens or display separate window screens, and the above-mentioned selection process can be carried out swiftly within the game screen in mid-competition.

The ranking information receiving portion 28 receives ranking information that is sent from the competition server 101 at a time of logging into the competition server 101 or at a time of competition completion. The ranking display portion 29 displays current rankings of players on the monitor 21*a* based on the ranking information received by the ranking information receiving portion 28.

The communications status confirming portion 30 is a portion that confirms the communications status between itself and the competition server 101 and the communications statuses between the opponent terminal devices, and is provided with a regular period communications status confirming portion 300*a* and a competition communications status confirming portion 300*b*. After connection to the competition server 101, the regular period communications status confirming portion 300*a* sends regular period data (heartbeats) to the competition server 101 at predetermined time intervals (for example, every 10 seconds), while confirming whether or not the regular period communications between itself and the competition server 101 are established. The competition communications status confirming portion 300*b* detects the transceiving status of data between itself and the opponent terminal device in mid-competition while confirming whether or not competition communications are established between itself and the opponent terminal device.

For example, when considering a case where communications of the terminal device A are disrupted in mid-competition between the player A of the terminal device A and the player B of the terminal device B, although the terminal device B confirms that regular period communications are established between the competition server 101 and the terminal device B according to the regular period communications status confirming portion 300*a*, it confirms that competition communications between the terminal device A and the terminal device B are disrupted according to the competition communications status confirming portion 300*b*. In this way, the communications status confirming portion 30 of the terminal device B detects that the opponent terminal (the terminal device A) has disrupted communications in mid-competition.

In a case where it is detected by the communications status confirming portion 30 that the opponent terminal (the terminal device A) has disrupted communications in mid-competition, the communications disruption information sending portion 31 sends communications disruption information to the competition server 101 to the effect that communications with the opponent terminal have been disrupted in mid-competition, thereby carrying out an abnormal completion notification to the competition server 101.

Figure 7:
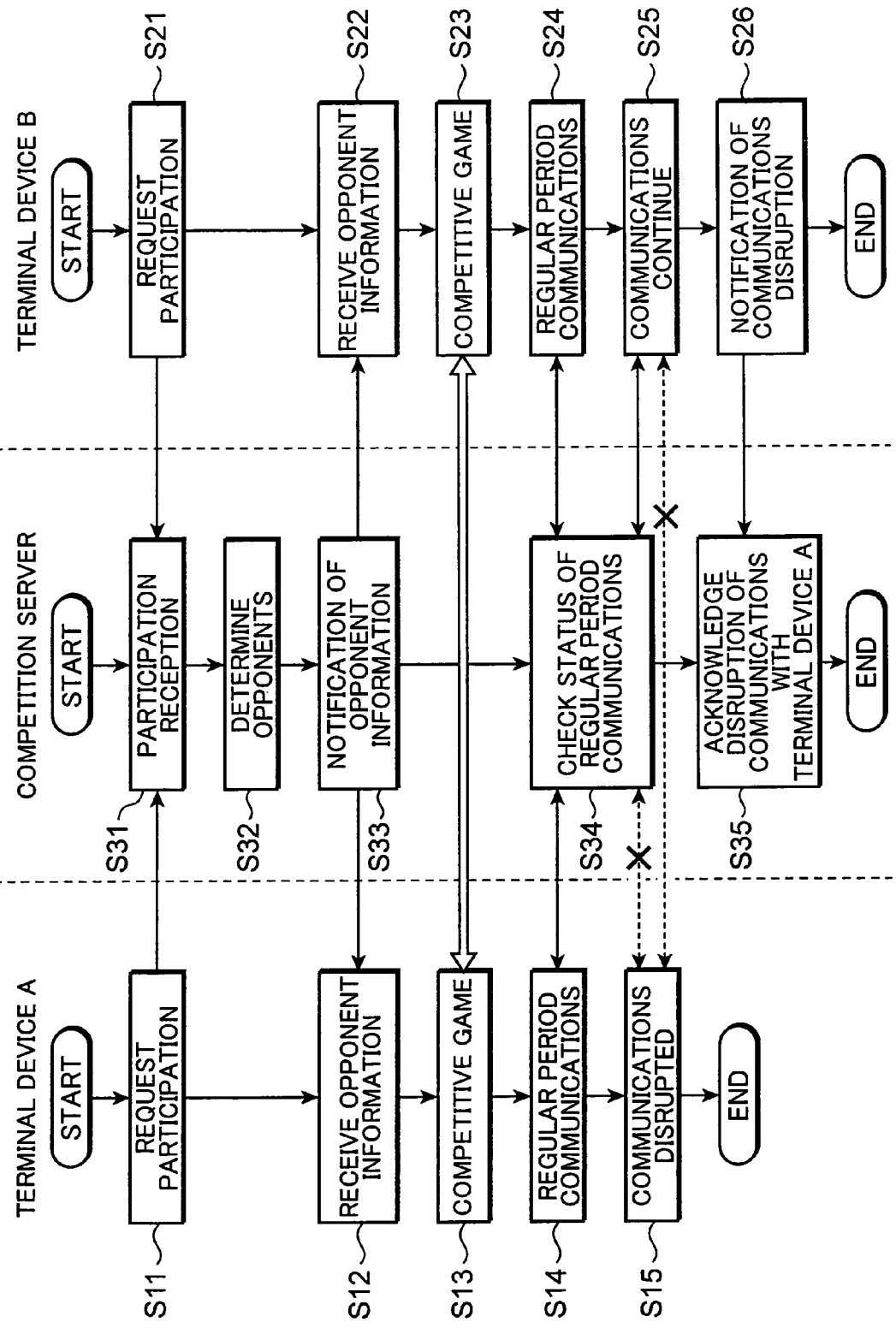
FIG. 7 is a flowchart showing main operations during competition in the network game system according to one embodiment of the present invention.
Figure 8:
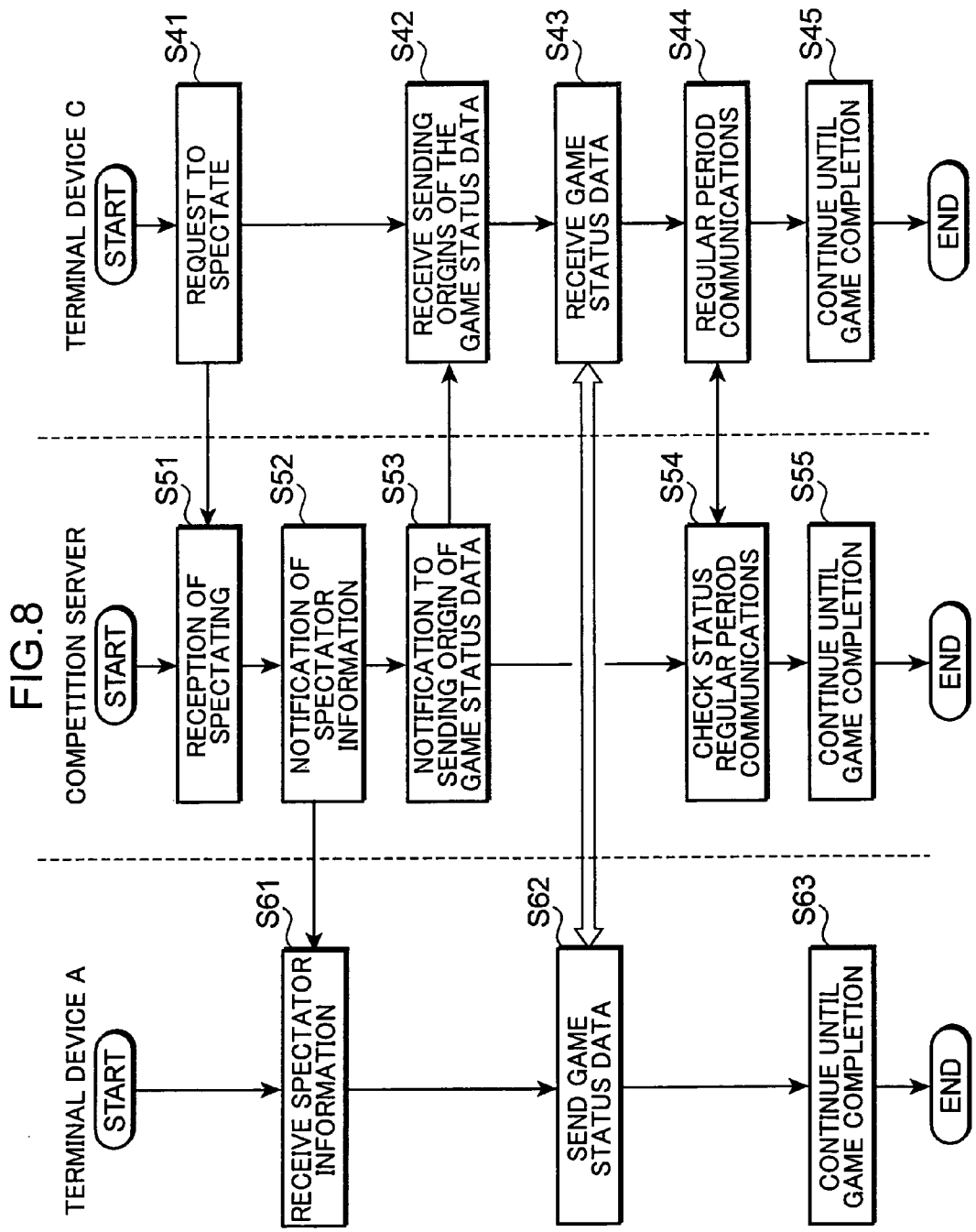
FIG. 8 is a flowchart showing main operations during spectating in the network game system according to one embodiment of the present invention.
Figure 9:
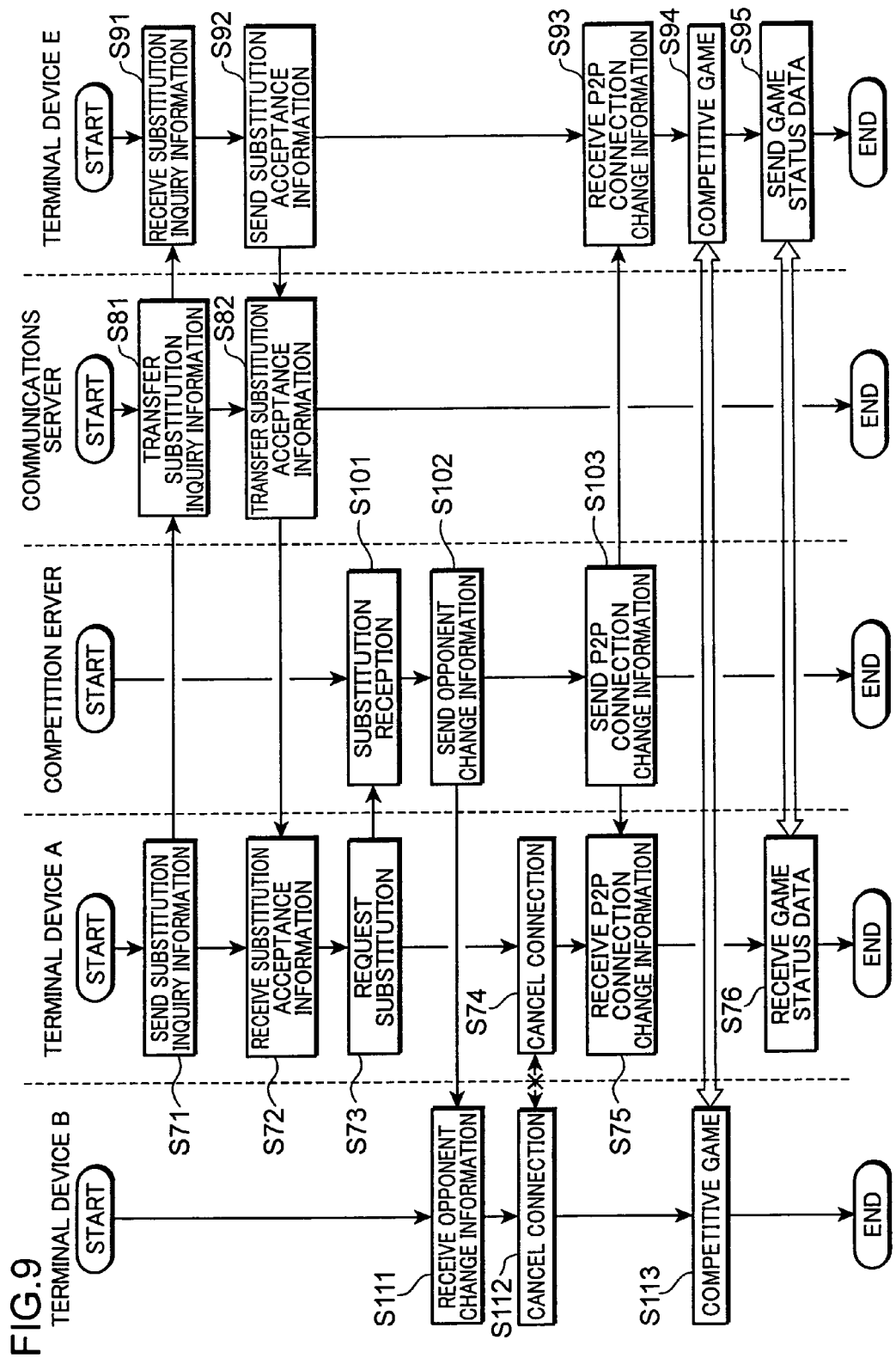
FIG. 9 is a flowchart showing main operations during a player and spectator substitution in the network game system according to one embodiment of the present invention.

Next, description is given regarding the overall operations of the network game system 100 according to the present embodiment using the flowcharts shown in FIGS. 7 to 9.

The flowchart of FIG. 7 shows an operation example that assumes a case in which the terminal device A of the player A and the terminal device B of the player B joining the network game system 100, the terminal devices A and B undergo matching, and the player A (competitor A) and the player B (competitor B) compete.

To join the network game, it is necessary for each player to incorporate his or her terminal device into the network game system 100. Accordingly, after operating the terminal device A to carry out conditions and settings, the player A carries out a request to participate (log in) to the network game to the competition server 101 (S11). Similarly, after operating the terminal device B to carry out various conditions and settings, the player B carries out a request to participate (log in) to the network game to the competition server 101 (S21).

Having received the requests to participate from the terminal devices A and B, the competition server 101 carries out a login authentication, then performs reception of participation of the terminal devices A and B to the network game (S31). After this, the competition server 101 carries out matching by which combinations of opponents are determined from groups of terminals that have requested a competition constituted by multiple terminal devices that are requesting a competition (S32). Here, description continues assuming that the terminal device A and the terminal device B have been matched. The competition server 101 gives notification of opponent information to the terminal device A and the terminal device B that have been matched (S33).

The terminal device A receives the opponent information from the competition server 101 (S12) and the terminal device B receives the opponent information from the competition server 101 (S22), thereby enabling the terminal devices A and B to be connected to each other by P2P, and the terminal devices A and B commence the competitive game (S13 and S23).

Furthermore, the terminal devices A and B carry out regular period communications in which regular period data (heartbeats) are sent to the competition server 101 in mid-competition (S14 and S24). Then, the competition server 101 confirms the regular period communications status between the terminal devices A and B by receiving the heartbeats from the terminal devices A and B (S34).

Here, in a case where the communications of the terminal device A have been disrupted in mid-competition (S15), the regular period communications between the terminal device A and the competition server 101 are interrupted and the competition communications between the terminal device A and the terminal device B are also interrupted. On the other hand, the regular period communications between the terminal device B and the competition server 101 continue (S25). In this case, the competition server 101 can determine that communications with the terminal device A have been disrupted in mid-competition from the state that regular period communications from the terminal device A have been interrupted and regular period communications from the terminal device B have continued. Furthermore, the terminal device B can determine that communications with the terminal device A have been disrupted in mid-competition from the fact that competition communications between itself and the terminal device A have been disrupted even though the regular period communications between itself and the competition server 101 have been able to continue. Accordingly, the terminal device B sends communications disruption information to the competition server 101 giving indication to the effect that communications with the terminal device A have been disrupted in mid-competition (S26). The competition server 101 confirms that communications with the terminal device A have been disrupted in mid-competition by receiving the communications disruption information from the terminal device B (S35).

Furthermore, the flowchart of FIG. 8 shows an operations example that assumes a case in which the user C who is operating the terminal device C becomes a spectator of the game being competed in by the player A, and receives game status data from the terminal device A of the player A to carry out spectating.

To become a spectator of the game being competed by the player A, the user C operates the terminal device C and carries out a request to spectate (sends a command requesting to spectate) to the competition server 101 (S41). In response to this, the competition server 101 receives the command requesting to spectate and performs reception of game spectating such that the terminal device 103 of the user C (spectator C) is set as a spectating terminal (S51).

Next, the competition server 101 gives notification of spectator information to the terminal device A of the player A indicating that the user C has become a spectator (S52). At this time, the competition server 101 carries out an instruction to the terminal device A of the player A to the effect that the player A should carry out a P2P connection with the terminal device C of the user C and send game status data to the terminal device C. Furthermore, the competition server 101 gives notification to the terminal device C of the spectator C to the effect that the terminal device that is the destination for sending game status data using the P2P connection is the terminal device A (S53).

In this way, the terminal device of the spectator then joins the downstream side of the series that is serially connected to the competing terminal of the player (competitor) who the spectator wants to support. Here, in a case where, in regard to a mid-competition player, a limit is set such that only spectators of the terminal devices of the series that is serially connected to the competing terminal of that player are able to substitute, it becomes advantageous that the more friends a player has (or the more popular a player is), the more spectators that player has that are capable of substitution (accordingly, the range of variation in levels and abilities of spectators capable of substitution is increased). As a result, elements other than the player's own operational ability come into account and a hitherto unknown interest in the game can be brought out.

Next, the terminal device A, as a competing terminal, sends information of the terminal devices that should send spectator information and game status data (S61), and acknowledges that a P2P connection should be carried out with the terminal device C. Furthermore, the terminal device C, as a spectating terminal, sends information of the terminal devices that will become sending origins of the game status data (S42), and acknowledges that a P2P connection should be carried out with the terminal device A.

Then, a P2P connection is carried out between the terminal device A and the terminal device C, and the newest game status data is sent from the terminal device A to the terminal device C (S62 and S43). In this way, the spectator C of the terminal device C can spectate on the display screen of the terminal device C the game in which the player A is competing. The sending of the game status data from the terminal device A to the terminal device C continues until the completion of the game as long as the spectator C of the terminal device C does not stop spectating midway or as long as the communications between the terminal devices A and C are not interrupted by a network fault or the like (S63).

Furthermore, the terminal device C carries out regular period communications in which regular period data (heartbeats) are sent to the competition server 101 during spectating (S44). Then, the competition server 101 confirms the regular period communications status of the terminal device C by receiving the heartbeats from the terminal device C (S54). As long as the spectating of the spectator C of the terminal device C does not stop midway, these confirmations of the statuses of regular period communications by the terminal device C and the regular period communications by the competition server 101 continue until game completion (S45 and S55).

Furthermore, the flowchart of FIG. 9 shows an operations example assuming a case in which during a competition between the player A and the player B, the player A substitutes his own character operations with the spectator E. Hereinafter, description is given while referring to the operations example of the flowchart of FIG. 9 and also to FIGS. 10 to 15.

Here, as shown in FIG. 10, illustration is given of a case where, in a case where the player A (hereinafter competitor A) and the player B (hereinafter competitor B) are competing, the spectator C and the spectator E are present as spectators on the side of the competitor A, and the spectator D and the spectator F are present as spectators on the side of the competitor B.

In a case where the competitor A attempts to inquire to the spectator E about substitution, first the competitor A calls a timeout to the opponent competitor B to temporarily pause the competition. In this case, a competition pause command is sent from the terminal device A of the competitor A to the terminal device B of the competitor B via the competition server 101, and the competition goes into a state of being temporarily paused. At this time, the substitution time management portion 72c of the competition server 101 commences management of the substitution process time limit.

After the competition has gone into a state of being temporarily paused as described above, the competitor A, as shown in FIG. 11, inquires about substitution via the communications server 102 to the spectator E who desires substitution. That is, substitution inquiry information in which the spectator E is specified is sent from the terminal device A of the competitor A to the communications server 102 (S71). Here, the spectator E is a friend or acquaintance whose level of game operational ability is known in advance by the competitor A, or a spectator selected by the competitor A by referencing the rankings displayed in the spectator list. Having received the substitution inquiry information, the communications server 102 transfers this substitution inquiry information to the terminal device E of the spectator E (S81). Then, the terminal device E of the spectator E receives the substitution inquiry information from the communications server 102 (S91). Due to this, information indicating a substitution inquiry from the competitor A is displayed on the display screen of the terminal device E.

Then, in a case where the spectator E accepts the substitution, the terminal device E returns substitution acceptance information via the communications server 102 to the terminal device A of the competitor A (S92 and S82), and the terminal device A receives this substitution acceptance information (S72).

The above-described processes of substitution inquiry and acceptance (S71, S72, S81, S82, S91, and S92) may use either the aforementioned chat format or command format. It should be noted that in a case where the spectator does not desire substitution, it is also possible to reply with substitution refusal information to the terminal device A of the competitor A via the communications server 102. If the spectator refuses the substitution, the temporary pause is canceled according to the competition time with a failed substitution, and the competition between the competitor A and the competitor B recommences. And in a case where time is taken in the exchange of substitution inquiry and acceptance such that the substitution process time limit lapses, the temporary pause is canceled according to the competition time with a failed substitution, and the competition between the competitor A and the competitor B recommences. Here, description continues below assuming the spectator E has accepted the substitution with the substitution process time limit.

Figure 12:
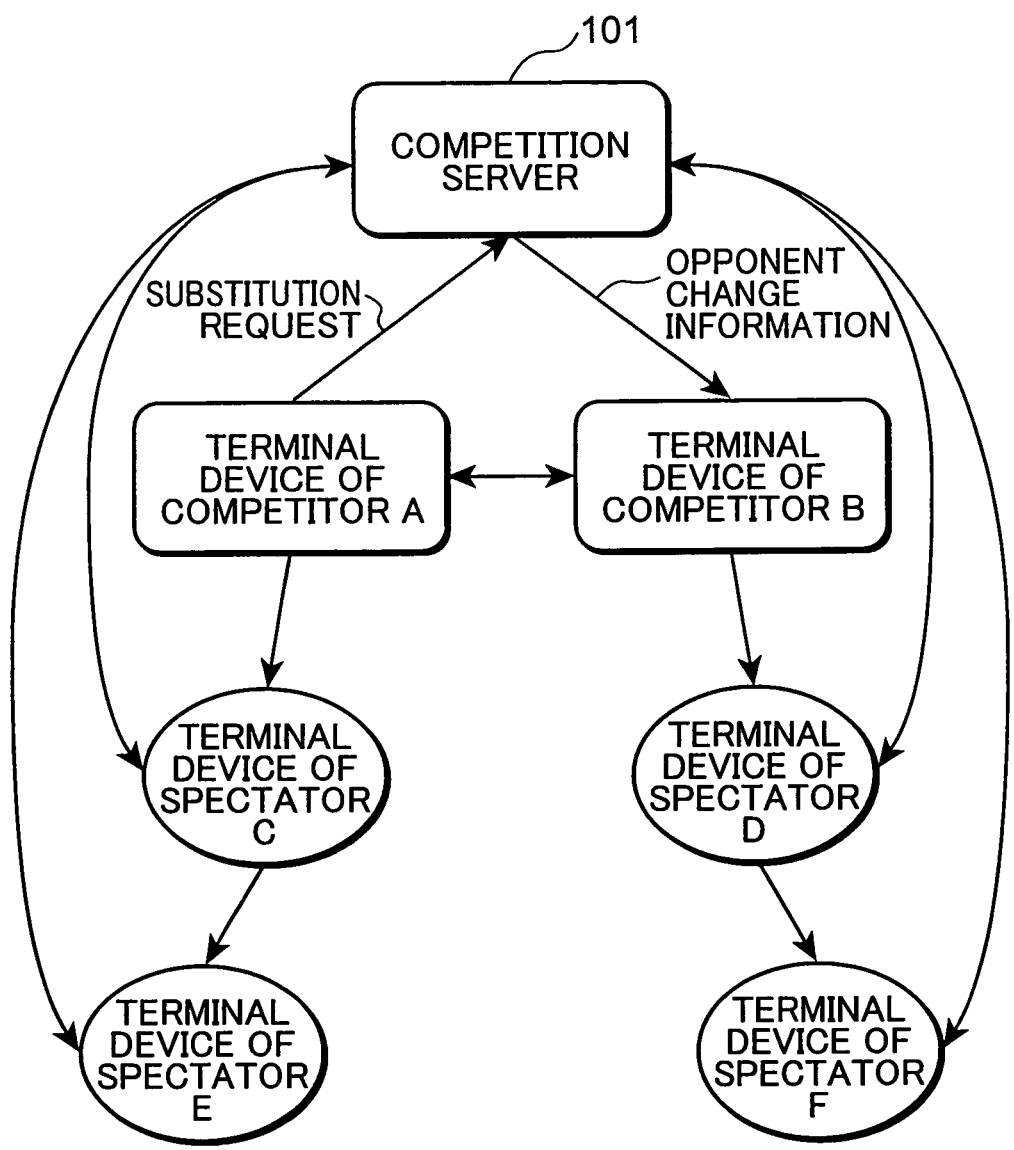
FIG. 12 is a descriptive diagram for describing one example of operations during a player and spectator substitution in the network game system according to one embodiment of the present invention.

Next, the terminal device A of the competitor A requests (sends a substitution request command) to the competition server 101, to the spectator E as shown in FIG. 12 (S73). Then, the competition server 101 receives the substitution request command and performs reception of the substitution request of the competitor A (S101).

Figure 13:
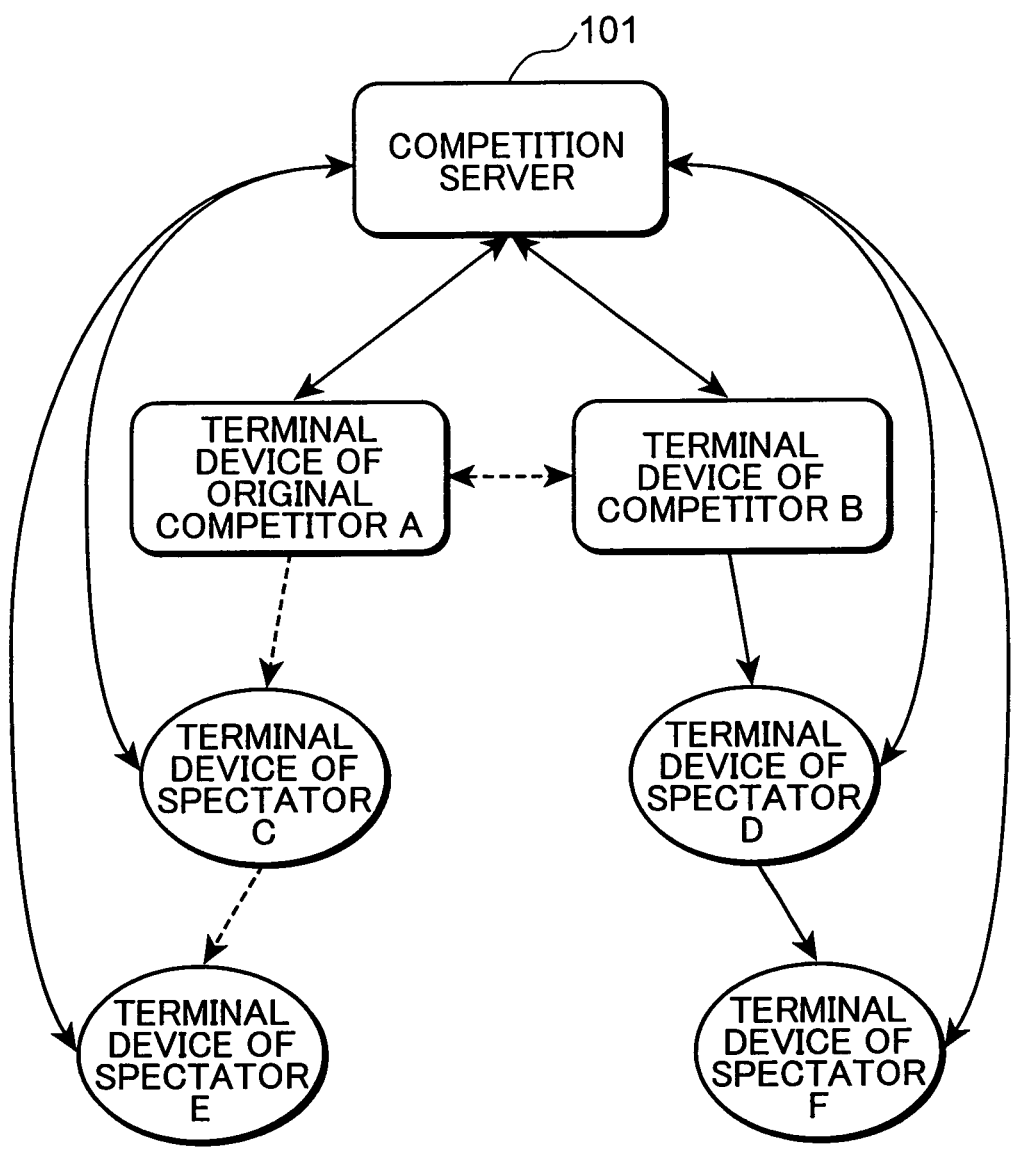
FIG. 13 is a descriptive diagram for describing one example of operations during a player and spectator substitution in the network game system according to one embodiment of the present invention.

Next, as shown in FIG. 12, the competition server 101 sends opponent change information to the terminal device B of the competitor B, who is the opponent of the competitor A, giving indication to the effect that the opponent will change from the competitor A to the spectator E (S102), and the terminal device B receives the opponent change information (S111). Then, as shown in FIG. 13, the P2P connection is canceled between the terminal device A, which requested substitution, and the terminal device B, which received the opponent change information (S74 and S112).

Figure 15:
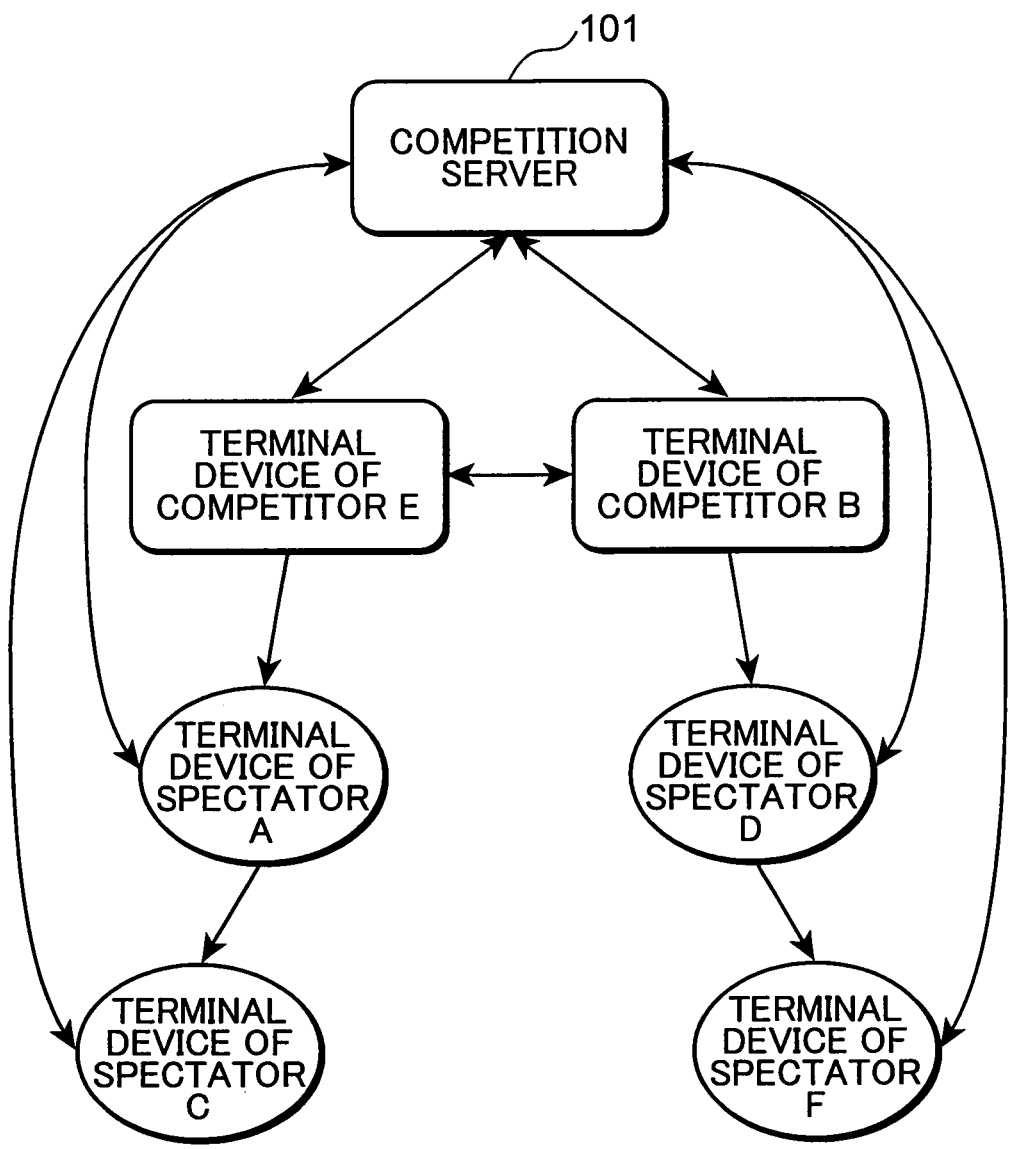
FIG. 15 is a descriptive diagram for describing one example of operations during a player and spectator substitution in the network game system according to one embodiment of the present invention.

Furthermore, to change the order of linked together P2P connections to terminal device E→terminal device A→terminal device C as shown in FIG. 14 for example, the competition server 101 sends P2P connection change information instructing the change in the P2P connections to each of the terminal devices (S103). Then, as shown in FIG. 15, after the order of P2P connections has changed, a P2P connection is carried out between the terminal device E and the terminal device B, and the user E changes from a spectator to a competitor and executes the competitive game with the competitor B (S94 and S113). In this competitive game, the user E, who has substituted the user A, executes the character operations (game operations) of the user A by operating the terminal device E of the user E (competitor E). At this time, the character itself of the user A on the game system does not change, and therefore there is no sense of strangeness in the game progression due to this substitution in regard to the competitor B operating the terminal device B.

It should be noted that if it is not displayed on the screen of the terminal device B of the competitor B that the person operating the character of the user A has changed from the user A to the user E, the game would be able to continue without the competitor B being aware of the substitution of persons operating the character of the user A. On the other hand, by displaying on the screen of the terminal device B of the competitor B that the person operating the character of the user A has changed from the user A to the user E, the competitor B can recognize the fact of the substitution of persons operating the character of the user A. For example, by substituting the person operating the character of the user A from the user A to the user E, sometimes the game operational ability on the user A side will improve suddenly, and therefore it is preferable to display the fact of the substitution on the screen of the terminal device B of the competitor B. Whether or not to display the fact of the substitution on the screen of the terminal device of the competitor can be set arbitrarily.

Furthermore, game status data is sent from the terminal device E to the terminal device A in mid-competition (S95), and the spectator A (the original competitor) of the terminal device A, which receives the game status data, can spectate the competitive game status on the display screen of the terminal device A (S76).

It should be noted that in case where the P2P connection between the terminal device E and the terminal device B is not completed (substitution processing is not completed) within the substitution process time limit due to network trouble or some other cause, the competition server 101 automatically executes the P2P connection between the terminal device A and the terminal device B and recommences the competition without substitution.

The above illustrated an example in which the competitor A substitutes with the spectator E who was spectating on the side of the competitor A, but there is no limitation to this and it is also possible to carry out a substitution of the competitor A with the spectator D or the spectator F who are spectating on the side of the competitor B who is the opponent of the competitor A. However, to bring out the game property that it is advantageous that the more friends a player has (or the more popular a player is), the more spectators that player has that are capable of substitution, it is preferable set a restriction such that only spectators of terminal devices in the series that is serially connected to the terminal device of that player are capable of substituting.

Figure 16:
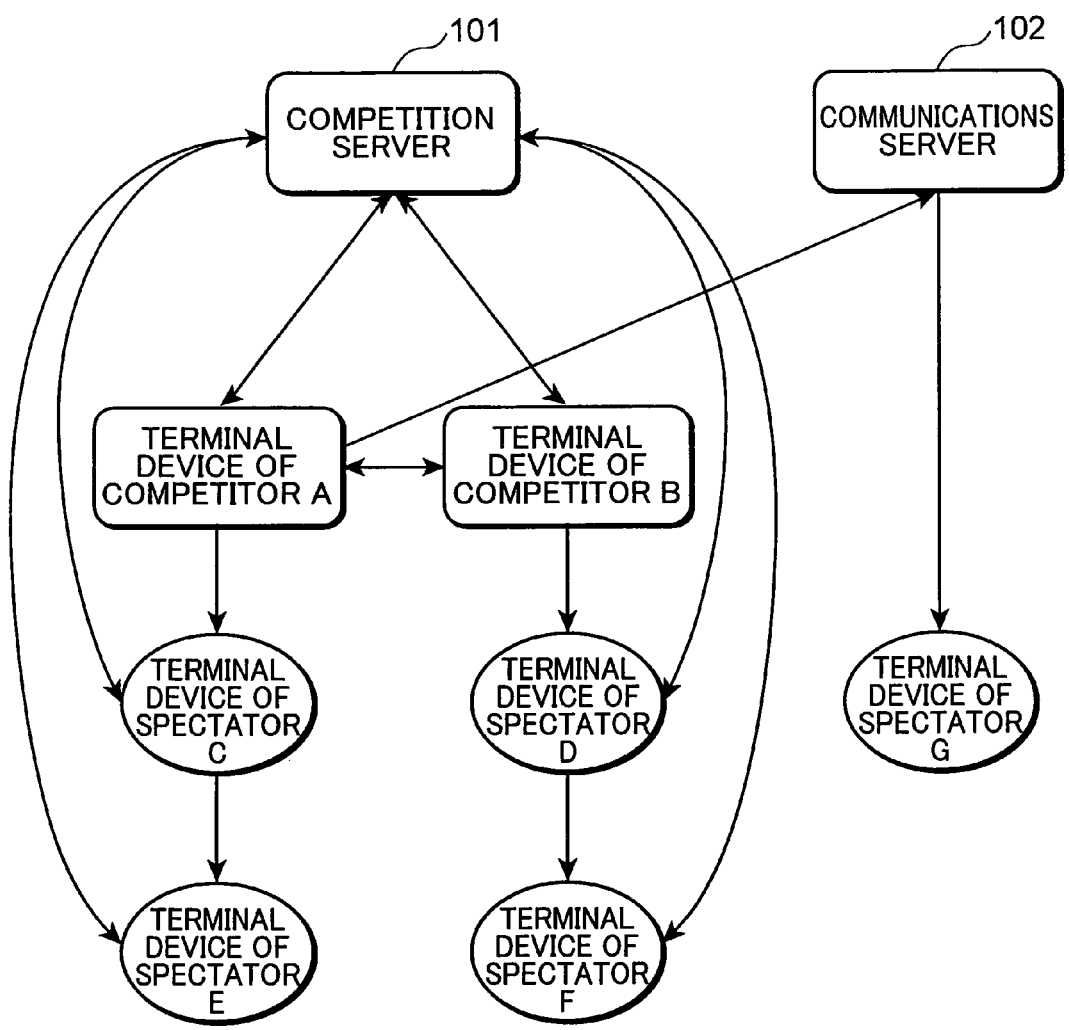
FIG. 16 is a descriptive diagram for describing another example of operations during a player and spectator substitution in the network game system according to one embodiment of the present invention.
Figure 17:
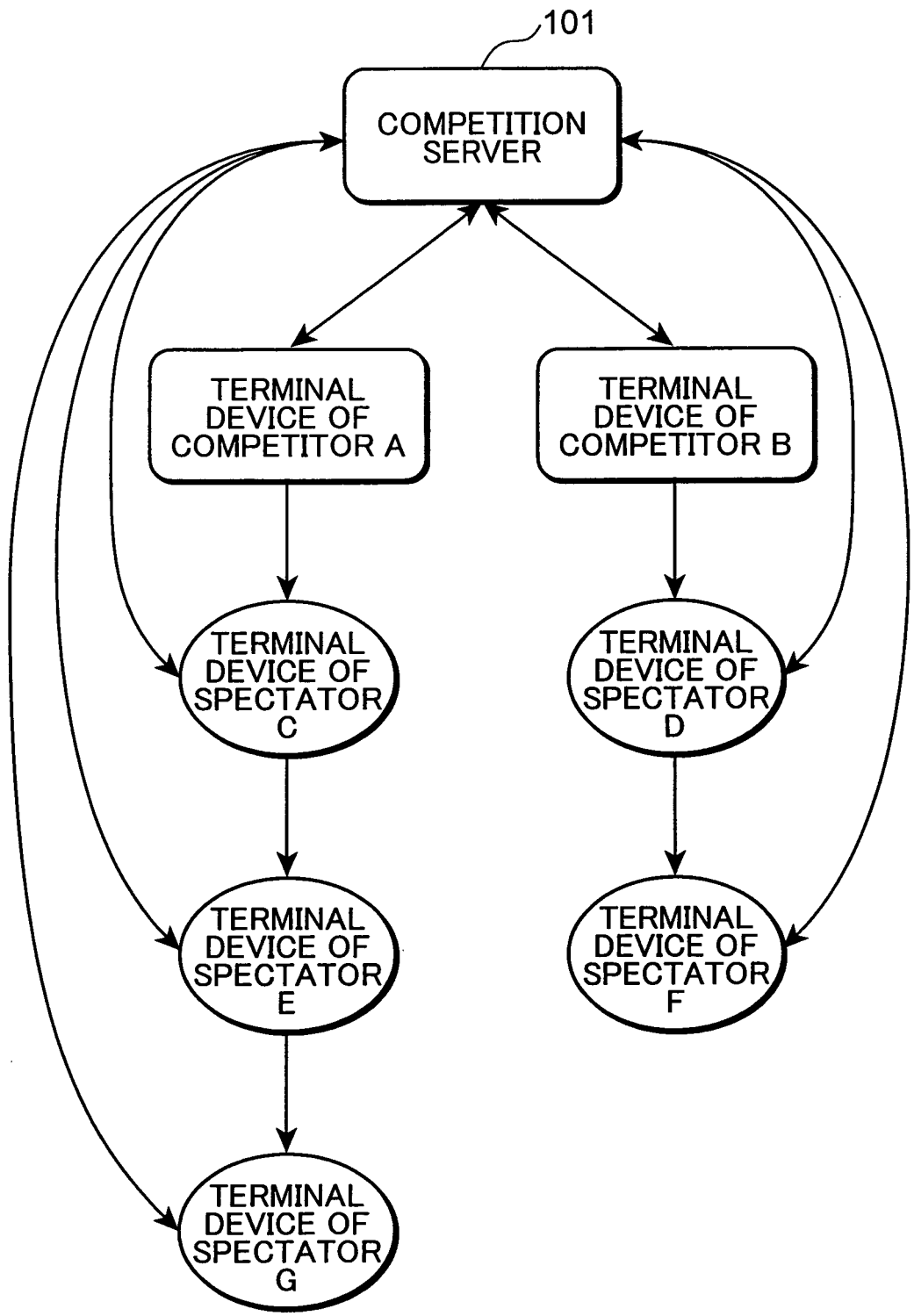
FIG. 17 is a descriptive diagram for describing another example of operations during a player and spectator substitution in the network game system according to one embodiment of the present invention.

Furthermore, the above illustrated an example in which the competitor A substituted with the spectator E who was already spectating, but as shown in FIG. 16 it is also possible that the competitor A calls for spectating to a user G who has not yet been spectating, and for substitution to be carried out with the user G. That is, if there is a state in which the terminal device G of the user G is logged into the competition server 101 and incorporated into the network game system 100, the competitor A can carry out a substitution inquiry to the user G using chat or the like via the communications server 102. Then, in a case where the user G accepts the substitution, if the terminal device G of the user G (spectator G) is then incorporated as a spectating terminal as shown in FIG. 17, substitution between the competitor A and the spectator G can be achieved as described above. In this way, the present network game system 100 enables substitution between competitors and spectators no matter the timing at which the terminal device is incorporated as a spectating terminal.

It should be noted that by incorporating the terminal device G of the user G in advance as a spectating terminal of the spectator G rather than simply as a user terminal in this way, the above-described substitution can be executed smoothly without requiring excessive time. Reasons for this are as follows. Namely, in a case of simulated games and sports games, the amount of data of the game environment that must be transferred (the amount of game status data) is enormous. Accordingly, in a case where the competitor A thinks he would like to be substituted by the user G in the above-described example, it would require an undesirably long time to transfer the game status data from the terminal device A of the competitor A to the terminal device G of the user G, and as a result, this would incur a problem in that the opponent would be caused to wait a long time. In regard to this point, with the above-described configuration, the terminal device G of the user G (spectator G) is in a state from the beginning in which it shares the same game status data as spectating terminal as the terminal device A of the competitor A, and therefore when the competitor A thinks he would like to be substituted as the player, it is possible to keep to a minimum the transfer of data to the terminal device G of the spectator G.

In this regard, as shown in FIG. 17, the terminal device G of the user G, who is a new spectator, is incorporated at the lowest position in the series that is serially connected to the terminal device A of the competitor A. That is, when the user G requests to the competition server 101 to spectate by specifying the terminal device of the competitor A so as to substitute the competitor A, the spectator management portion 70 of the competition server 101 connects the terminal device G of the user G as a spectating terminal to a further lower position than the terminal device E, which is the most downstream connected terminal device of the series that is serially connected to that competing terminal. In this way, by connecting the terminal device G of the new spectator G to the most downstream terminal device E in the series while maintaining the serial connections of the terminal devices C and E already present in the series of the competitor A as spectating terminals, the terminal device G can be incorporated as a spectating terminal easily and swiftly. And in a case where the terminal device G of the spectator G thereafter undergoes the substitution process to a competing terminal, the incorporation of the terminal device G of the user G as a spectating terminal is swift, and therefore the time required until substitution processing is completed can be shortened.

Furthermore, in a case where the user E (current competitor) who has substituted the user A (current spectator and original competitor) again substitutes the character operations of the user A with the user A, this can be achieved by carrying out the same processing as in the routine shown in the flowchart of FIG. 9. Further still, also in a case where the user E (current competitor) who substituted the user A is to be substituted by another spectator other than the user A (for example, the spectator C, D, or F in FIG. 15), this can be achieved by carrying out the same processing as in the routine shown in the flowchart of FIG. 9. Further still, it is also possible for the spectator after substitution (the current competitor) to substitute with a different spectator, and substitutions of character operations can basically be performed any number of times. However, since it is possible that game advancement will be stalled and the competitor's interest in the game will be lost due to frequent substitutions of character operations in mid-competition, an upper limit of number of times of substitutions per game may be established to avoid this.

The foregoing gave description regarding a game system in which a network game system was carried out using P2P connections in which direct data exchanges were carried out among the terminal devices 103, hereinafter description is given regarding a game system in which a network game system is carried out using client/server (C/S) connections.

Figure 18:
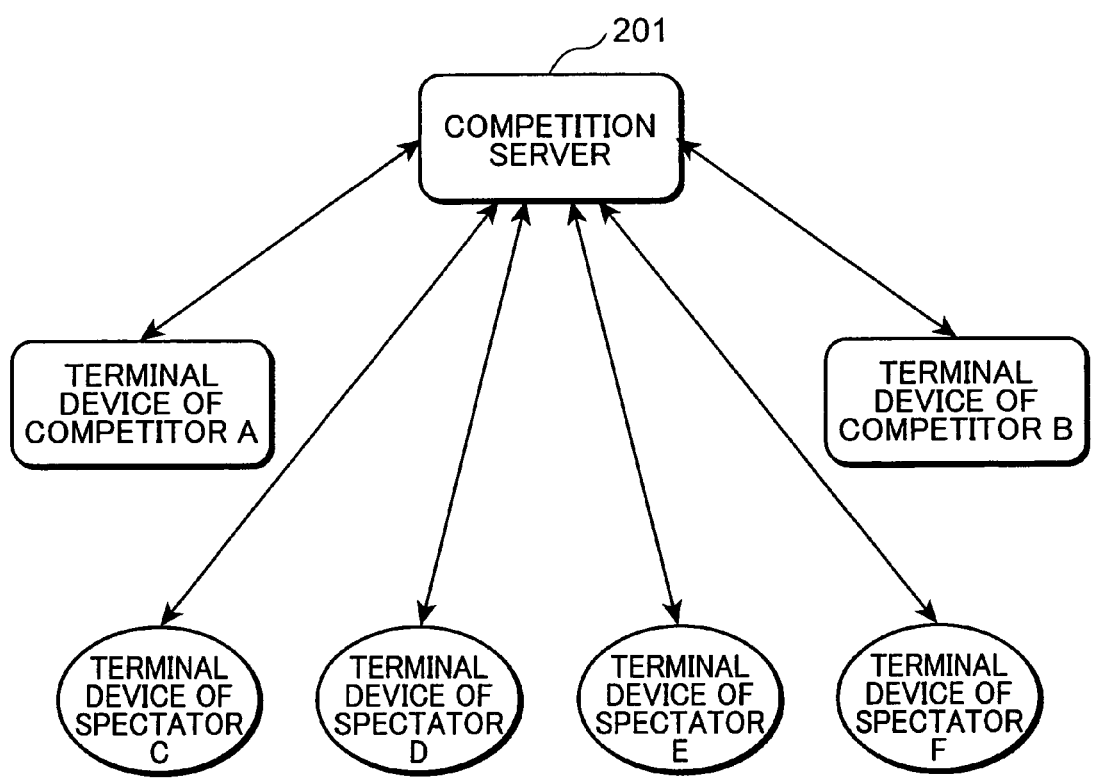
FIG. 18 is a descriptive diagram for describing yet another example of operations during a player and spectator substitution in the network game system according to one embodiment of the present invention.

As shown in the example of FIG. 18, in a game system of C/S connections, a competition server 201 and the terminal devices A, B, C, D, E, and F as clients are connected via the internet 104. And a competition between the competitor A and the competitor B, and the spectating by the spectators C, D, E, and F are all achieved via the competition server 201.

The basic configuration of the server control portion of the competition server 201 in the game system of C/S connections is equivalent to the server control portion 10c of the competition server 101 shown in FIG. 4, and therefore description thereof is omitted. However, a substitution management portion of the competition server 201 in the game system of C/S connections is configured without including the changed P2P connection information sending portion 72b of the substitution management portion 72 of the competition server 101 shown in FIG. 5.

Figure 19:
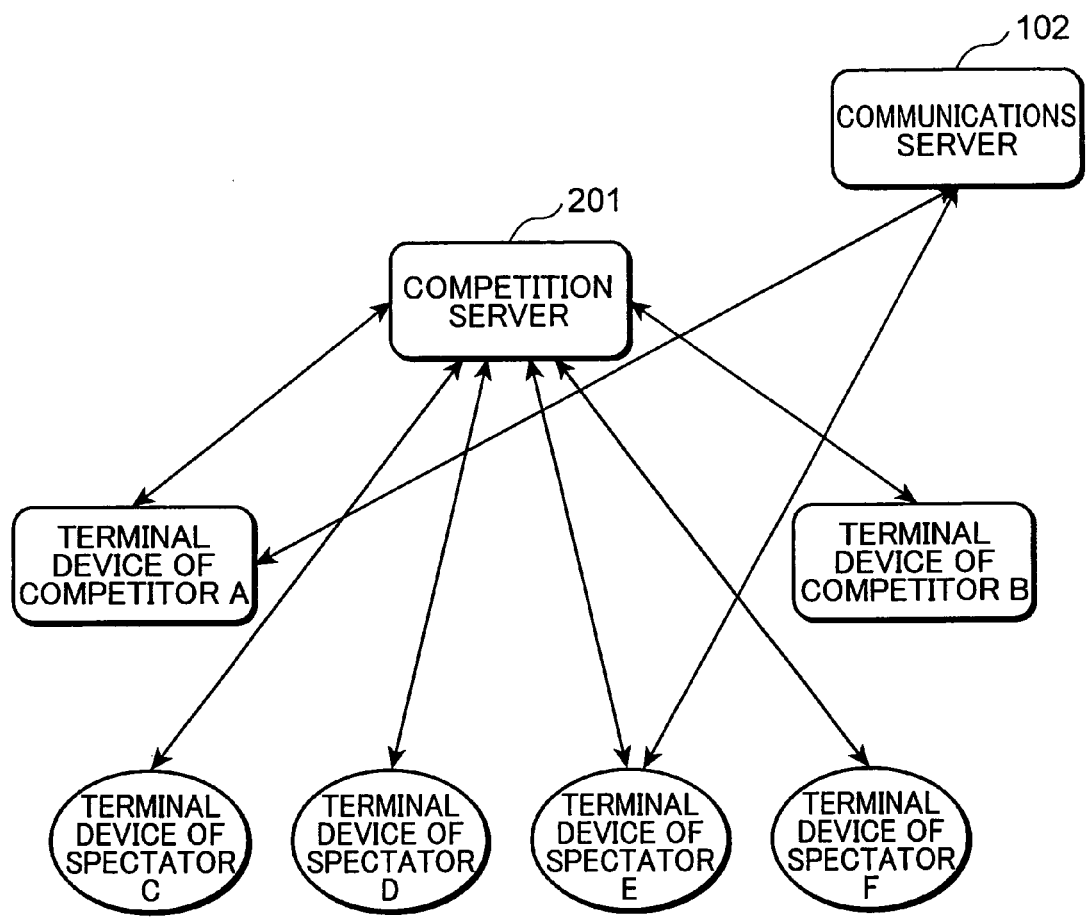
FIG. 19 is a descriptive diagram for describing yet another example of operations during a player and spectator substitution in the network game system according to one embodiment of the present invention.

In the aforementioned game system of C/S connections, in a case where the competitor A desires to substitute his or her own character operations to the spectator E, the competitor A inquires about substitution to the spectator E via the communications server 102 as shown in FIG. 19. This operation is that same as the operation shown in FIG. 11, and the substitution inquiry information is sent via the communications server 102 from the terminal device A of the player A to the terminal device E of the spectator E. Due to this, information indicating a substitution inquiry from the competitor A is displayed on the display screen of the terminal device E. And in a case where the spectator E accepts the substitution, the terminal device E replies with substitution acceptance information to the terminal device A of the competitor A via the communications server 102.

Figure 20:
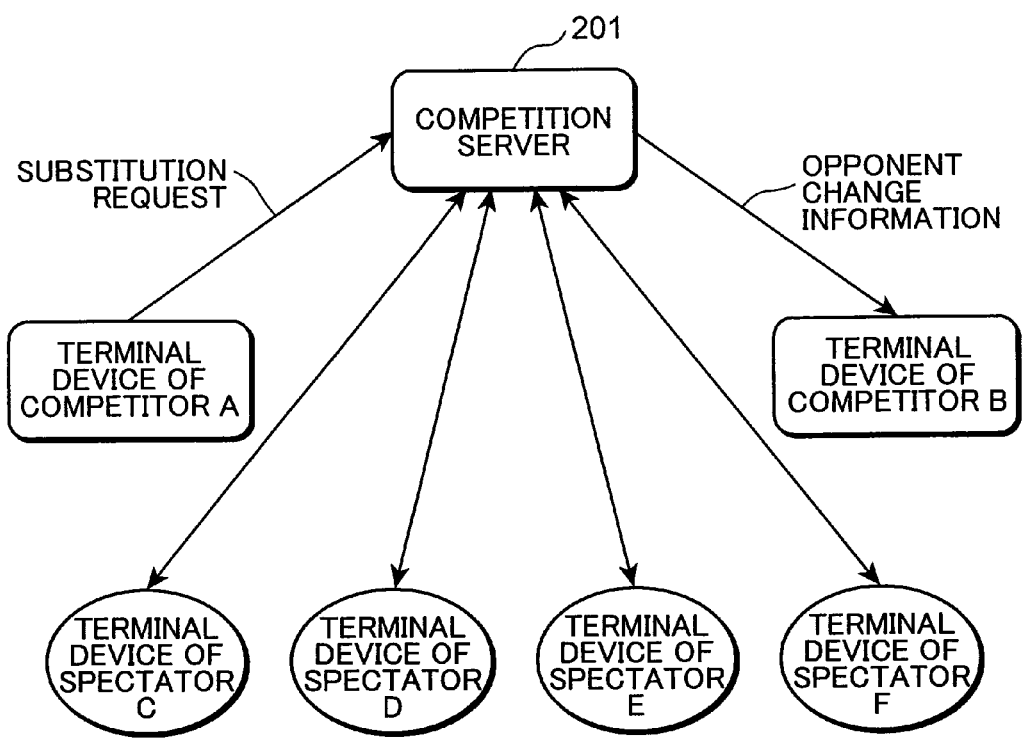
FIG. 20 is a descriptive diagram for describing yet another example of operations during a player and spectator substitution in the network game system according to one embodiment of the present invention.
Figure 21:
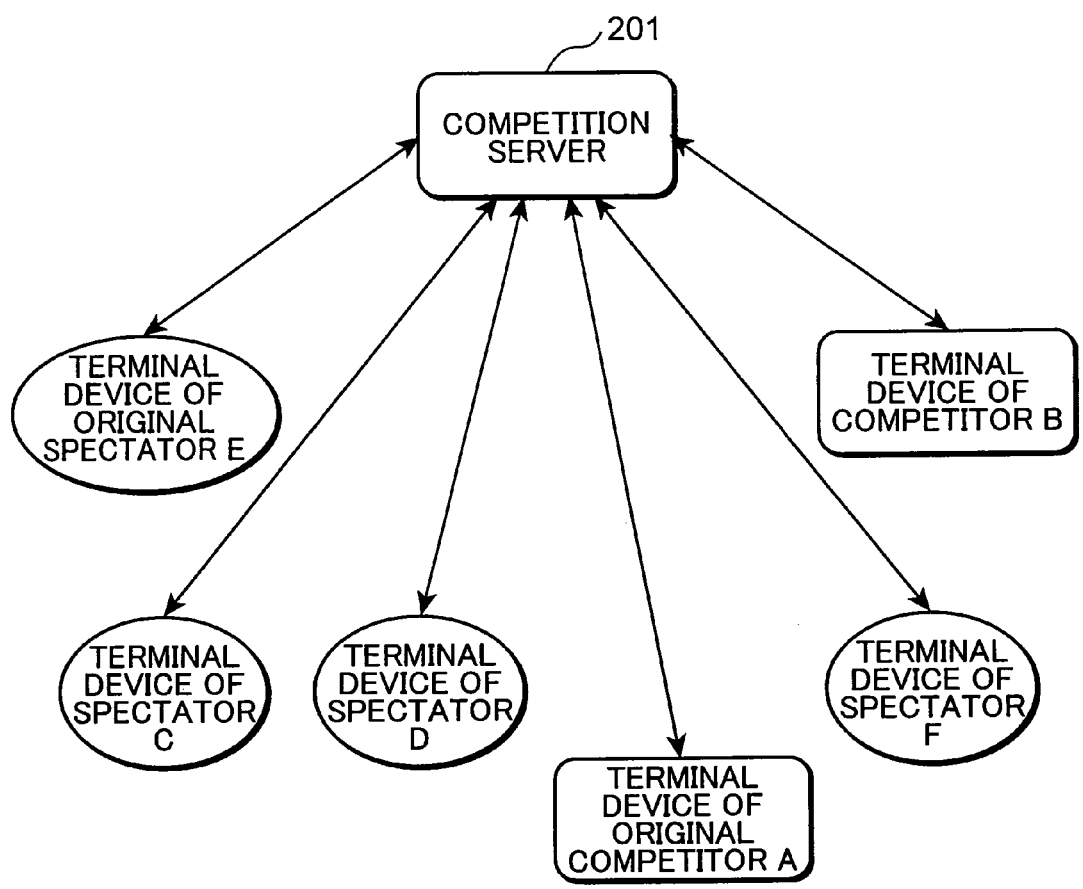
FIG. 21 is a descriptive diagram for describing yet another example of operations during a player and spectator substitution in the network game system according to one embodiment of the present invention.
Figure 22:
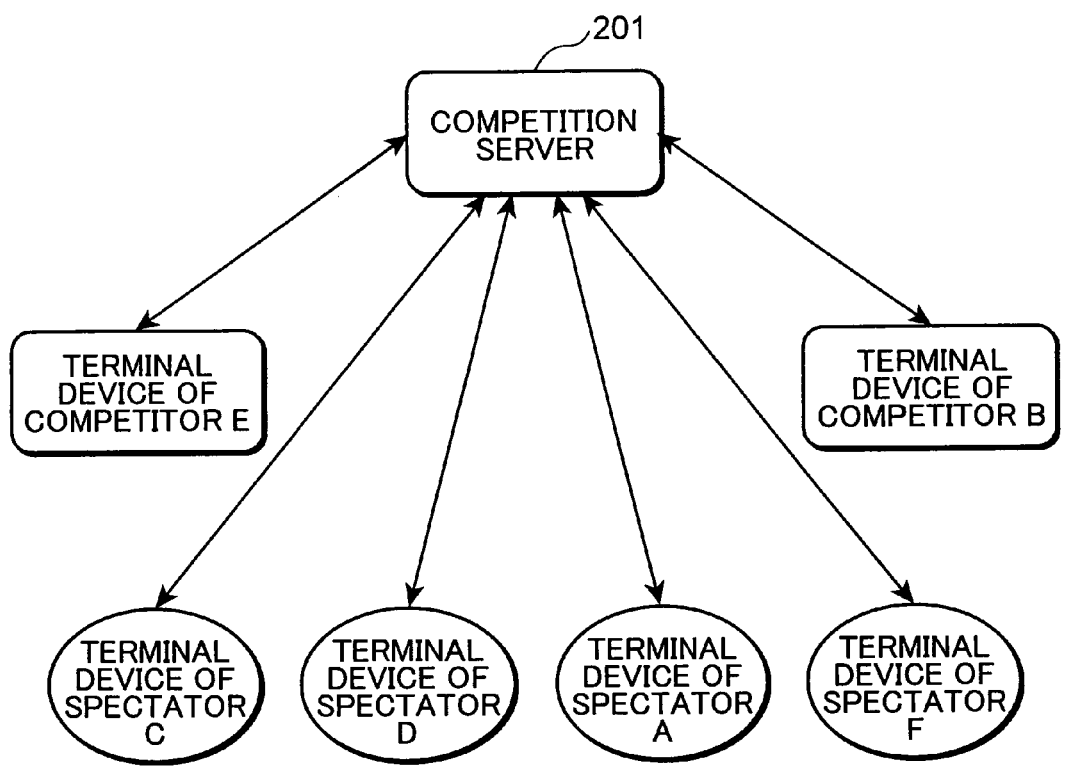
FIG. 22 is a descriptive diagram for describing yet another example of operations during a player and spectator substitution in the network game system according to one embodiment of the present invention.

Next, the terminal device A of the competitor A requests (sends a substitution request command) to the competition server 201, to the spectator E as shown in FIG. 20. Then, the competition server 201 receives the substitution request command and performs reception of the substitution request of the competitor A. Furthermore, the competition server 201 sends opponent change information to the terminal device B of the competitor B, who is the opponent of the competitor A, giving indication that the opponent will change from the competitor A to the spectator E. After this, as shown in FIG. 21, the competition server 201 performs a switch such that the terminal device A of the competitor A becomes a spectating terminal, while the terminal device E of the spectator E becomes a competing terminal, and the competitive game between the user E (competitor E) and the competitor B is achieved as is shown finally in FIG. 22. In this case, the user E, who has substituted the user A, executes the character operations of the user A by operating the terminal device E of the user E (competitor E). Furthermore, in mid-competition, game status data is sent from the competition server 201 to the terminal devices A, C, D, and F. Accordingly, the spectator A (the original competitor) of the terminal device A, which receives the game status data, can spectate the competitive game status on the display screen of the terminal device A.

In this way, in the game system of C/S connections, the communications processing for all the competing and spectating is executed via the competition server 201, and therefore although the load on the competition server 201 is large compared to the game system of P2P connections, the substitution process between a competitor and a spectator can be more easily achieved than the game system of P2P connections.

In a case where a spectator is present who has substituted a mid-competition player and carried out character operations of that player in the game system of either P2P connections or C/S connections, when the competitive game is completed, the competition server 101 (201) assigns ranking points to the spectator in response to the contribution ratio of that spectator. Accordingly, description is given of one example of operations of the competition server 101 (201) at a time of completion of the competitive game with reference to the flowchart in FIG. 23. Here, description is given assuming a competition between the player A operating the terminal device A and the player B operating the terminal device B. Furthermore, in regard to the flowchart of operations in FIG. 23, the operations of the competition server 101 and the competition server 201 are equivalent, and therefore description is given below in regard to the operations of the competition server 101.

In a case where the competitive game has been completed (yes at S121), the competition server 101 determines whether or not the player A is the winner who won the competition (S122). In a case where the player A is the winner (yes at S122), the competition server 101 further determines whether or not the player A was substituted midway by a spectator in mid-competition (S123). And in a case where there was a substitution by a spectator in mid-competition (yes at S123), the contribution ratio calculating portion 73 of the competition server 101 obtains the contribution ratio indicating a degree of contribution to the game of the spectator who has substituted the player A in mid-competition and carried out character operations of that player A (S124). After this, the ranking management portion 67 (point assigning portion) of the competition server 101 assigns ranking points (merit points) to the spectator in accordance with the obtained contribution ratio (S125). After this, the ranking management portion 67 of the competition server 101, with respect to the player A who is the winner, adds the winning points to the ranking points of the player A (S126). It should be noted that in a case where there was no substitution by a spectator in mid-competition (no at S123), a transition is made to S126 without executing the foregoing S124 and S126.

Furthermore, in a case the player A is the loser (no at S122), the ranking management portion 67 of the competition server 101, with respect to the player A, deducts the losing points from the ranking points of the player A (S127).

After the foregoing S126 or S127, the ranking management portion 67 of the competition server 101 carries out a ranking determination based on the ranking points of the player A (S128). At this time, the ranking management portion 67 of the competition server 101 carries out the ranking determination based on the current total of ranking points of that spectator also in a case where ranking points are assigned to the spectator in accordance with the contribution ratio in S125. Then, the ranking notification portion 68 of the competition server 101 sends ranking information to the player A and the spectator who performed the substitution (S129).

After this, the competition server 101 determines whether or not the ranking determination process has been completed for all players (S130). Here, the ranking determination process has not been completed for the player B (no at S130), and therefore a transition is made to S122 and processing equivalent to the foregoing is performed in regard to the player B also.

In this way, by assigning ranking points to the spectator in response to the contribution ratio of the spectator who has been substituted for the mid-competition player, interest in the game can be increased for spectators who perform substitutions. Furthermore, unlike substitutions without any merit, by offering a chance to obtain merits by substitution, a game environment can be constructed in which spectators enthusiastically attempt to carry out substitutions, and it is possible to smoothly operate a system in which substitution is possible.

As described above, the network game system 100 according to the present embodiment is a game system in which, while players who are respectively operating competing terminals including at least two terminal devices 103 are competing against each other via a communications network such as the interne 104, a spectator operating a spectating terminal including at least one terminal device 103 can spectate a mid-competition game status via the communications network. And the network game system 100 is provided with a substitution management portion 72 that, when a mid-competition player requests to substitute that player's game operations to the spectator, performs management of a substitution process in which the terminal device 103 of that player is set as a spectating terminal, and the terminal device 103 of the spectator is set as a competing terminal. The spectator who has been substituted for the player by the substitution management portion 72 is capable of substituting and executing the game operations of that player by operating the terminal device 103 of the spectator.

In this way, it is possible for a player who has become caught in a situation where an unfamiliar game operation must be carried out to receive help from a spectator and advance their own game, and interest in the game can be improved for players who had lost interest in the game itself due to being unfamiliar with specific operations up until then. Further still, a game environment is constructed that enables mid-competition players and spectators to substitute, and therefore it is also possible to form a community of users that would be definitely unobtainable merely by spectating a competition. In this way, a highly interesting communications-based competitive-type network game is achieved.

It should be noted in regard to the functions of the competition server 101, that these may be achieved at any location within the network game system 100 as described above, and therefore these can also be achieved by multiple servers in a distributed function manner. Furthermore, a system configuration is also possible in which some or all of the functions of the competition server 101 are held in one or multiple small type computers within the network game system 100.

Furthermore, in the present embodiment, the communications server 102 is provided separate to the competition server 101, but a configuration is also possible in which the functions of the communications server 102 are caused to be held in the competition server 101 and the communications server 102 is omitted.

In the network game system 100 according to the present embodiment, the various computer-readable programs executed by the competition server 101 (201) and the terminal devices are recorded on any of the various computer-readable recording media such as hard disks, optical disks (CD-ROM, DVD-ROM, and UMD or the like), flexible disks, semiconductor memories, ROM cassettes, or cartridges or the like of home video game machines, then read out and executed by the competition server 101 and the terminal devices. It should be noted that a portion configured to supply these various programs to the competition server 101 and the terminal devices is not limited to the above-mentioned recording media, but can also be carried out and achieved via the internet 104. For example, in a case where these are downloadable via the internet 104 from a website or the like provided by a company that manages the network game, it is also possible that the game progress programs and the like can be directly downloaded and executed from the website.

Furthermore, in the present embodiment, description was given using a baseball game as one example of the network game, but applicable network games are not limited to this, and this can be applied to various types of games as long as it is a communications-based competitive-type network game in which players compete against each other. For example, this can be applied in an equivalent manner to various sports games such as soccer, tennis, and combat sports or the like, as well as simulation games, shooting games, and role playing games or the like.

Furthermore, in the present embodiment, an example was illustrated in which two players competed one on one, but this is also applicable to a network game in which three or more players are competing. For example, in a competitive car racing game, three or more players can participate in the game.

Furthermore, in the present embodiment, an example was illustrated using rankings as ability evaluation levels, but there is no limitation to this, and other ability evaluation levels may be used expressed as rewards, honors, or grades or the like for example.

It should be noted that in the present embodiment, description was given of an example in which ranking points were used as merit points to be assigned to substituting spectators in accordance with their contribution ratio, but there is no limitation to this. For example, virtual currency points that can be used within the game may be used as merit points, and the virtual currency points may be assigned to substituting spectators in accordance with the contribution ratio of those spectators.

The following presents a summary of technical specifications of the foregoing game system.

(1) A game system according to one embodiment of the present invention is a game system that executes a network game in which, while players who are respectively operating competing terminals including at least two terminal devices are competing against each other via a communications network, a spectator operating a spectating terminal including at least one terminal device can spectate a mid-competition game status via the communications network, and includes a substitution management portion that, when a mid-competition player requests to substitute that player's game operations to the spectator, performs management of a substitution process in which the terminal device of that player is set as a spectating terminal, and the terminal device of the spectator is set as the competing terminal, wherein the spectator who has been substituted for that player by the substitution management portion executes the game operations of that player by operating the terminal device of the spectator.

With the above-described configuration, it is possible for players operating terminal devices to compete against each via the communications network and for spectators operating spectating terminals to spectate the mid-competition game status. And, for example, when a mid-competition player becomes caught in a situation where an unfamiliar game operation must be carried out, or when the player wants to confirm how another spectator would carry out an operational technique in a certain situation in a game, that player can request the spectator to substitute the game operations. At the time of this request, the substitution management portion manages the substitution process such that the terminal device of the player is set as the spectating terminal, and the terminal device of the spectator is set as the competing terminal. In this way, the spectator who has substituted the player can execute a substitution via the communications network of the game operations of that player by operating the spectator's terminal device.

Here, although the mid-competition player and the spectator have substituted, the spectator is merely executing a substitution of the game operations of that player. That is, the character itself of the player on the game screen does not change, and therefore there is no sense of strangeness in the game progression due to this substitution.

In this way, it is possible for a player who has become caught in a situation where an unfamiliar game operation must be carried out to receive help from a spectator and advance their own game. Accordingly, interest in the game can be improved for players who had lost interest in the game itself due to being unfamiliar with specific operations up until then.

Further still, a game environment is constructed that enables mid-competition players and spectators to substitute, and therefore it is also possible to form a community of users that would be definitely unobtainable merely by spectating a competition, and from this perspective also, the interest in the network game can be increased.

(2) In the above-described configuration, it is preferable that a spectator list display portion is further included that displays a spectator list for a mid-competition player to select a spectator, whom that player desires to substitute that player's game operations, on the terminal device operated by that player, wherein the spectator list display portion is provided with an ability evaluation level display portion that displays within the spectator list an ability evaluation level that indicates a level of game operational ability of each spectator.

With the above-described configuration, a spectator list for selecting spectators who desire substitution is displayed on the terminal device operated by the player. And an ability evaluation level indicating a level of game operational ability of each of the spectators is also displayed within the spectator list. In this way, a player who is carrying out a competition can select spectators who desire substitution while confirming the ability evaluation level of each spectator. Accordingly, not only in regard to friends and acquaintances whose game operational ability the player knows in advance, but also in regard to spectators for which the player has no advance knowledge whatsoever, the player can then select a spectator who desires substitution if the player refers to the ability evaluation level. Accordingly, the range of selection of spectators desiring substitution is widened for the player, and interest in the network game can be further increased.

(3) It is preferable that the above-described configuration further includes a contribution ratio calculating portion for obtaining a contribution ratio indicating a degree of contribution to a game of a spectator who has substituted a mid-competition player and carried out that player's game operations, and a point assigning portion that assigns merit points to the spectator in response to the contribution ratio obtained by the contribution ratio calculating portion.

In this way, by assigning merit points to the spectator in response to the contribution ratio of the spectator who has been substituted for the mid-competition player, interest in the game can be increased for spectators who perform substitutions. Furthermore, unlike substitutions without any merit, by offering a chance to obtain merits by substitution, a game environment can be constructed in which spectators enthusiastically attempt to carry out substitutions, and it becomes possible to smoothly operate a system in which substitution is possible.

(4) In the foregoing configuration it is preferable that, when the spectator who has substituted that player requests to again be substituted by that player or another spectator, the substitution management portion returns the terminal device of the spectator who has substituted that player from a competing terminal to a spectating terminal, and sets the terminal device of that player or the other spectator as a competing terminal.

With this configuration, it is possible for a spectator who has already substituted a player to again substitute with the original player or another spectator. That is, the substitution process regarding the game operations of the original player can be carried out multiple times. In this way, a substitution system environment having a high level of freedom can be constructed.

(5) In the foregoing configuration it is preferable that the at least one terminal device included in the spectating terminal is connected sequentially and serially to any of the competing terminals respectively, and that a spectator management portion is further included that, when a person desiring to spectate requests to spectate while specifying a competing terminal, connects the terminal device of the person desiring to spectate as a spectating terminal to a series that is serially connected to the specified competing terminal, and the substitution management portion performs management of the substitution process so that, with respect to a mid-competition player, only spectators of terminal devices in the series that is serially connected to the competing terminal of that player are permitted to perform substitution.

With this configuration, the terminal device of the spectator is then incorporated as spectating terminal within the series that is serially connected to the competing terminal of the player who the spectator wants to support. Here, a limit can be established by the substitution management portion so that, with respect to a mid-competition player, only spectators of terminal devices in the series that is serially connected to the competing terminal of that player are permitted to perform substitution. Accordingly, it becomes advantageous that the more friends a player has (or the more popular a player is), the more spectators that player has that are capable of substitution (accordingly, the range of variation in levels and abilities of spectators capable of substitution is increased). As a result, elements other than the player's own operational ability come into account and a hitherto unknown interest in the game can be brought out.

(6) In the foregoing configuration it is preferable that, when a new person desiring to spectate requests to spectate while specifying a competing terminal, the spectator management portion connects the terminal device of the new person desiring to spectate as a spectating terminal to a further lower position than a most downstream connected terminal device of the series that is serially connected to the specified competing terminal.

With the above-described configuration, by connecting the terminal device of a new spectator further downstream from the most downstream terminal device in the series while maintaining the serial connections of the terminal devices already present in the series as spectating terminals, the terminal device of the new spectator can be incorporated as a spectating terminal easily and swiftly. Accordingly, for example, after the terminal device of a new spectator has been incorporated as a spectating terminal, even in a case where the player immediately substitutes with the new spectator, since the incorporation of the new spectating terminal is swift, the time required until substitution processing is achieved can be shortened.

(7) A game system control method according to another aspect of the present invention is a game system control method that executes a network game in which, while players who are respectively operating competing terminals including at least two terminal devices are competing against each other via a communications network, a spectator operating a spectating terminal including at least one terminal device can spectate a mid-competition game status via the communications network, that includes a substitution management step by which, when a mid-competition player requests to substitute that player's game operations to the spectator, management is performed of a substitution process in which the terminal device of that player is set as a spectating terminal, and the terminal device of the spectator is set as the competing terminal.

(8) A recording medium on which a program is recorded according to yet another aspect of the present invention is a program that causes a computer included in a game system that executes a network game in which, while players who are respectively operating competing terminals including at least two terminal devices are competing against each other via a communications network, a spectator operating a spectating terminal including at least one terminal device can spectate a mid-competition game status via the communications network, to execute a substitution management function by which, when a mid-competition player requests to substitute that player's game operations to the spectator, management is performed of a substitution process in which the terminal device of that player is set as a spectating terminal, and the terminal device of the spectator is set as the competing terminal.

This application is based on Japanese Patent Application Serial No. 2010-97988 filed in Japan Patent Office on Apr. 21, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A game system that executes a network game in which, while players who are respectively operating competing terminals including at least two terminal devices are competing against each other via a communications network, a spectator operating a spectating terminal including at least one terminal device can spectate a mid-competition game status via the communications network, the game system comprising:
   a substitution management portion that, when a mid-competition player requests to substitute that player's game operations to the spectator, performs management of a substitution process in which the terminal device of that player is set as a spectating terminal, and the terminal device of the spectator is set as the competing terminal,
   wherein the spectator who has been substituted for that player by the substitution management portion executes the game operations of that player by operating the terminal device of the spectator,
   wherein the at least one terminal device included in the spectating terminal is connected together with and serially to any of the competing terminals respectively by a peer to peer connection in which direct data exchanges are performed among the terminal devices,
   wherein the game system further comprises a spectator management portion that, when a person desiring to spectate while specifying a competing terminal, connects the terminal device of the person desiring to spectate as a spectating terminal to a series that is serially connected to the specified competing terminal,
   wherein the substitution management portion performs management of the substitution process so that, with respect to a mid-competition player, only spectators of terminal devices in the series that is serially connected to the competing terminal of that player are permitted to perform substitution, and
   wherein the substitution management portion, when having received from the terminal device of the mid-competition player a substitution request command for substitution of that player's game operations to the spectator, sends changed opponent information to the terminal device of the player who is competing with the player who has requested the substitution, the changed opponent information indicating that the opponent has changed from the competitor to a spectator and sends changed peer to peer connection information to the terminal device of the player who has requested the substitution and to terminal devices which are peer to peer connected to that terminal device, the change connection information indicating that the peer to peer connection has changed, and thereby setting the terminal device of the spectator as the competing terminal.

2. The game system according to claim 1, further comprising: a spectator list display portion that displays a spectator list for a mid-competition player to select a spectator, whom that player desires to substitute that player's game operations, on the terminal device operated by that player, wherein the spectator list display portion is provided with an ability evaluation level display portion that displays within the spectator list an ability evaluation level that indicates a level of game operational ability of each spectator.

3. The game system according to claim 1, further comprising: a contribution ratio calculating portion for obtaining a contribution ratio indicating a degree of contribution to a game of a spectator who has substituted a mid-competition player and carried out that player's game operations, and a point assigning portion that assigns merit points to the spectator in response to the contribution ratio obtained by the contribution ratio calculating portion.

4. The game system according to claim 1, wherein, when the spectator who has substituted that player requests to again be substituted by that player or another spectator, the substitution management portion returns the terminal device of the spectator who has substituted that player from a competing terminal to a spectating terminal, and sets the terminal device of that player or the other spectator as a competing terminal.

5. The game system according to claim 1, wherein, when a new person desiring to spectate requests to spectate while specifying a competing terminal, the spectator management portion connects the terminal device of the new person desiring to spectate as a spectating terminal to a further lower position than a most downstream connected terminal device of the series that is serially connected to the specified competing terminal.

6. A game system control method that executes a network game in which, while players who are respectively operating competing terminals including at least two terminal devices are competing against each other via a communications network, a spectator operating a spectating terminal including at least one terminal device can spectate a mid-competition game status via the communications network, the game system control method comprising:
   a substitution management step by which, when a mid-competition player requests to substitute that player's game operations to the spectator, management is performed of a substitution process in which the terminal device of that player is set as a spectating terminal, and the terminal device of the spectator is set as the competing terminal,
   wherein the at least one terminal device included in the spectating terminal is connected together with and serially to any of the competing terminals respectively by a peer to peer connection in which direct data exchanges are performed among the terminal devices,
   wherein the game system control method further comprises a spectator management step that, when a person desiring to spectate while specifying a competing terminal, connects the terminal device of the person desiring to spectate as a spectating terminal to a series that is serially connected to the specified competing terminal,
   wherein the substitution management step performs management of the substitution process so that, with respect to a mid-competition player, only spectators of terminal devices in the series that is serially connected to the competing terminal of that player are permitted to perform substitution, and
   wherein the substitution management step, when having received from the terminal device of the mid-competition player a substitution request command for substitution of that player's game operations to the spectator, sends changed opponent information to the terminal device of the player who is competing with the player who has requested the substitution, the changed opponent information indicating that the opponent has changed from the competitor to a spectator and sends changed peer to peer connection information to the terminal device of the player who has requested the substitution and to terminal device which are peer to peer connected to that terminal device, the change connection information indicating that the peer to peer connection has changed, and thereby setting the terminal device of the spectator as the competing terminal.

7. A non-transitory recording medium on which a program is recorded that causes a computer included in a game system that executes a network game in which, while players who are respectively operating competing terminals including at least two terminal devices are competing against each other via a communications network, a spectator operating a spectating terminal including at least one terminal device can spectate a mid-competition game status via the communications network, to execute a substitution management function by which, when a mid-competition player requests to substitute that player's game operations to the spectator, management is performed of a substitution process in which the terminal device of that player is set as a spectating terminal, and the terminal device of the spectator is set as the competing terminal, wherein the at least one terminal device included in the spectating terminal is connected together with and serially to any of the competing terminals respectively by a peer to peer connection in which direct data exchanges are performed among the terminal devices, wherein the non-transitory recording medium further comprises the computer to execute a spectator management function that, when a person desiring to spectate while specifying a competing terminal, connects the terminal device of the person desiring to spectate as a spectating terminal to a series that is serially connected to the specified competing terminal, wherein the substitution management function performs management of the substitution process so that, with respect to a mid-competition player, only spectators of terminal devices in the series that is serially connected to the competing terminal of that player are permitted to perform substitution, and wherein the substitution management function, when having received from the terminal device of the mid-competition player a substitution request command for substitution of that player's game operations to the spectator, sends changed opponent information to the terminal device of the player who is competing with the player who has requested the substitution, the changed opponent information indicating that the opponent has changed from the competitor to a spectator and sends changed peer to peer connection information to the terminal device of the player who has requested the substitution and to terminal devices which are peer to peer connected to that terminal device, the change connection information indicating that the peer to peer connection has changed, and thereby setting the terminal device of the spectator as the competing terminal.

* * * * *